United States Patent
Lim et al.

(10) Patent No.: US 9,648,628 B2
(45) Date of Patent: May 9, 2017

(54) INTER-LINK INTERFERENCE INFORMATION SHARING-BASED LINK SCHEDULING METHOD AND APPARATUS FOR USE IN WIRELESS COMMUNICATION SYSTEM

(71) Applicants: Samsung Electronics Co. Ltd., Suwon-si, Gyeonggi-do (KR); Research & Business Foundation SUNGKYUNKWAN UNIVERSITY, Suwon-si, Gyeonggi-do (KR)

(72) Inventors: Chiwoo Lim, Suwon-si (KR); Sang-Hyo Kim, Seoul (KR); Jin Whan Kang, Seoul (KR); Kyungkyu Kim, Suwon-si (KR); Daegyun Kim, Seongnam-si (KR); Seunghoon Park, Seoul (KR); Chung-ki Cho, Suwon-si (KR)

(73) Assignees: Samsung Electronics Co., Ltd., Suwon-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 231 days.

(21) Appl. No.: 13/968,889

(22) Filed: Aug. 16, 2013

(65) Prior Publication Data
US 2014/0050166 A1 Feb. 20, 2014

(30) Foreign Application Priority Data
Aug. 17, 2012 (KR) .......................... 10-2012-0090104

(51) Int. Cl.
*H04W 72/08* (2009.01)

(52) U.S. Cl.
CPC ................................ *H04W 72/082* (2013.01)

(58) Field of Classification Search
CPC ..... H04W 16/14; H04W 72/082; H04W 4/02; H04W 72/0453; H04W 72/046
See application file for complete search history.

(56) References Cited

U.S. PATENT DOCUMENTS 6,023,477 A * 2/2000 Dent ............................. 370/509
6,519,473 B1 * 2/2003 Park et al. .................... 455/522
(Continued)

FOREIGN PATENT DOCUMENTS

WO 2010-139847 A1 12/2010

OTHER PUBLICATIONS

Xinzhou Wu et al., FlashLinQ: a synchronous distributed scheduler for peer-to-peer ad hoc networks, Sep. 29, 2010.
(Continued)

*Primary Examiner* — Ayaz Sheikh
*Assistant Examiner* — Debebe Asefa
(74) *Attorney, Agent, or Firm* — Jefferson IP Law, LLP

(57) ABSTRACT

A link scheduling apparatus and method based on inter-link interference information sharing technique for use in a Device to Device (D2D) communication system is provided. A link scheduling method of a transmission node in a wireless communication system supporting direct communication between the transmission and recipient nodes includes receiving interference information of at least one recipient node from at least one recipient node, the interference occurring from at least one transmission node to at least one reception node, scheduling links based on the interference information; and transmitting data according to the scheduled links.

20 Claims, 22 Drawing Sheets

(56) References Cited

U.S. PATENT DOCUMENTS

| | | | |
|---|---|---|---|
| 8,072,917 B2 | 12/2011 | Wu et al. | |
| 8,213,874 B2* | 7/2012 | Agnew | H04W 16/14 |
| | | | 370/252 |
| 8,958,753 B2* | 2/2015 | Wang | H04B 1/712 |
| | | | 370/252 |
| 2005/0195843 A1 | 9/2005 | Ahmed et al. | |
| 2008/0037409 A1* | 2/2008 | Ogawa et al. | 370/201 |
| 2009/0088080 A1 | 4/2009 | Zhang et al. | |
| 2011/0081871 A1 | 4/2011 | Molnar | |

OTHER PUBLICATIONS

Xinzhou Wu et al., "FlashLinQ: A Synchronous Distributed Scheduler for Peer-to-Peer Ad Hoc Networks," 48th Annual Allerton Conference on Communication, Control, and Computing, Sep. 29-Oct. 1, 2010, p. 514-521.

\* cited by examiner

USE Tx BLOCK CORRESPONDING TO CID

DIRECT POWER SIGNAL TRANSMISSION

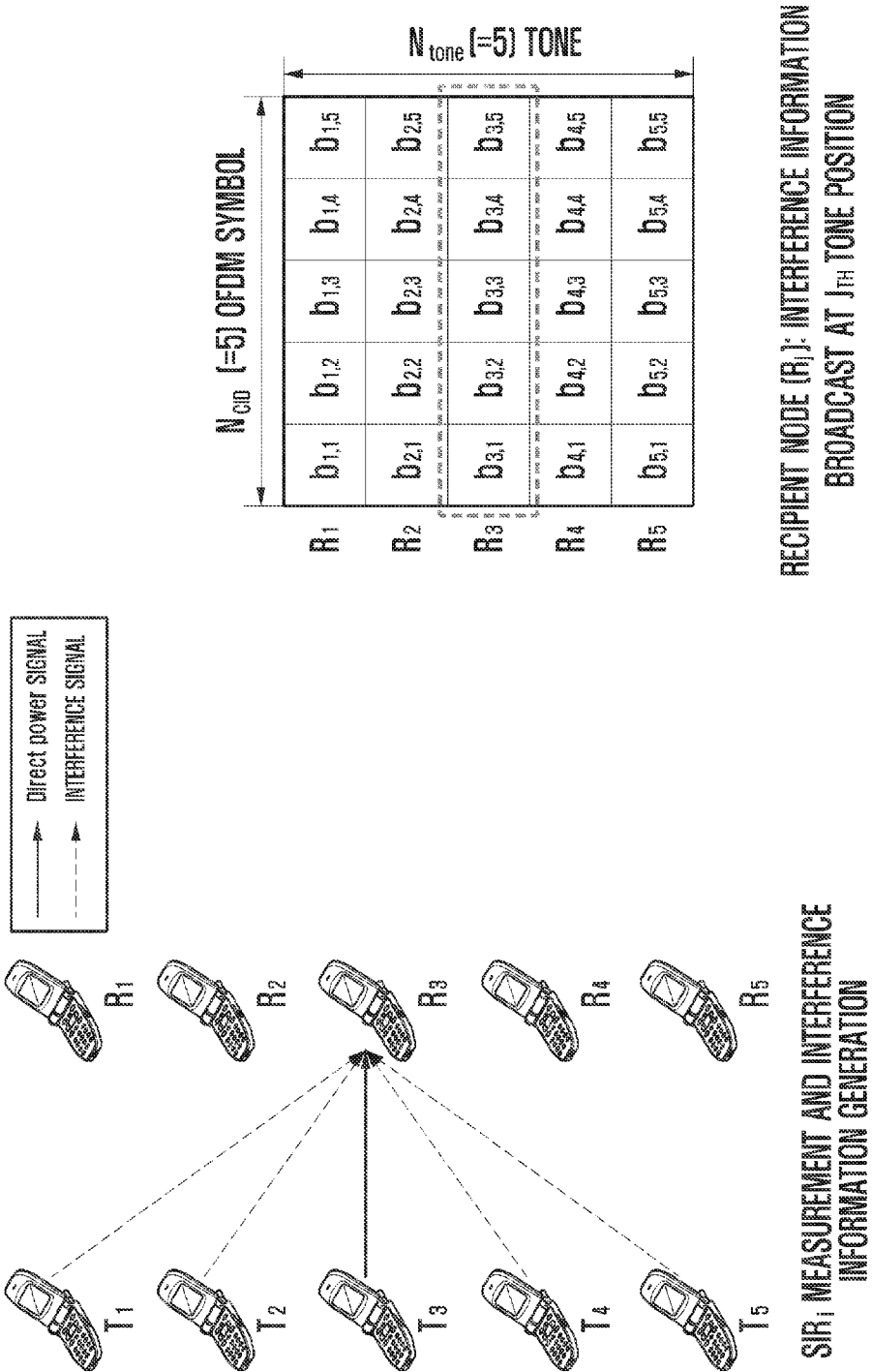

FIG. 9

$$B_{Intf} = \begin{array}{|c|c|c|c|c|} \hline b_{1,1} & b_{1,2} & b_{1,3} & b_{1,4} & b_{1,5} \\ \hline b_{2,1} & b_{2,2} & b_{2,3} & b_{2,4} & b_{2,5} \\ \hline b_{3,1} & b_{3,2} & b_{3,3} & b_{3,4} & b_{3,5} \\ \hline b_{4,1} & b_{4,2} & b_{4,3} & b_{4,4} & b_{4,5} \\ \hline b_{5,1} & b_{5,2} & b_{5,3} & b_{5,4} & b_{5,5} \\ \hline \end{array}$$

Rx INDEX →
Tx INDEX →

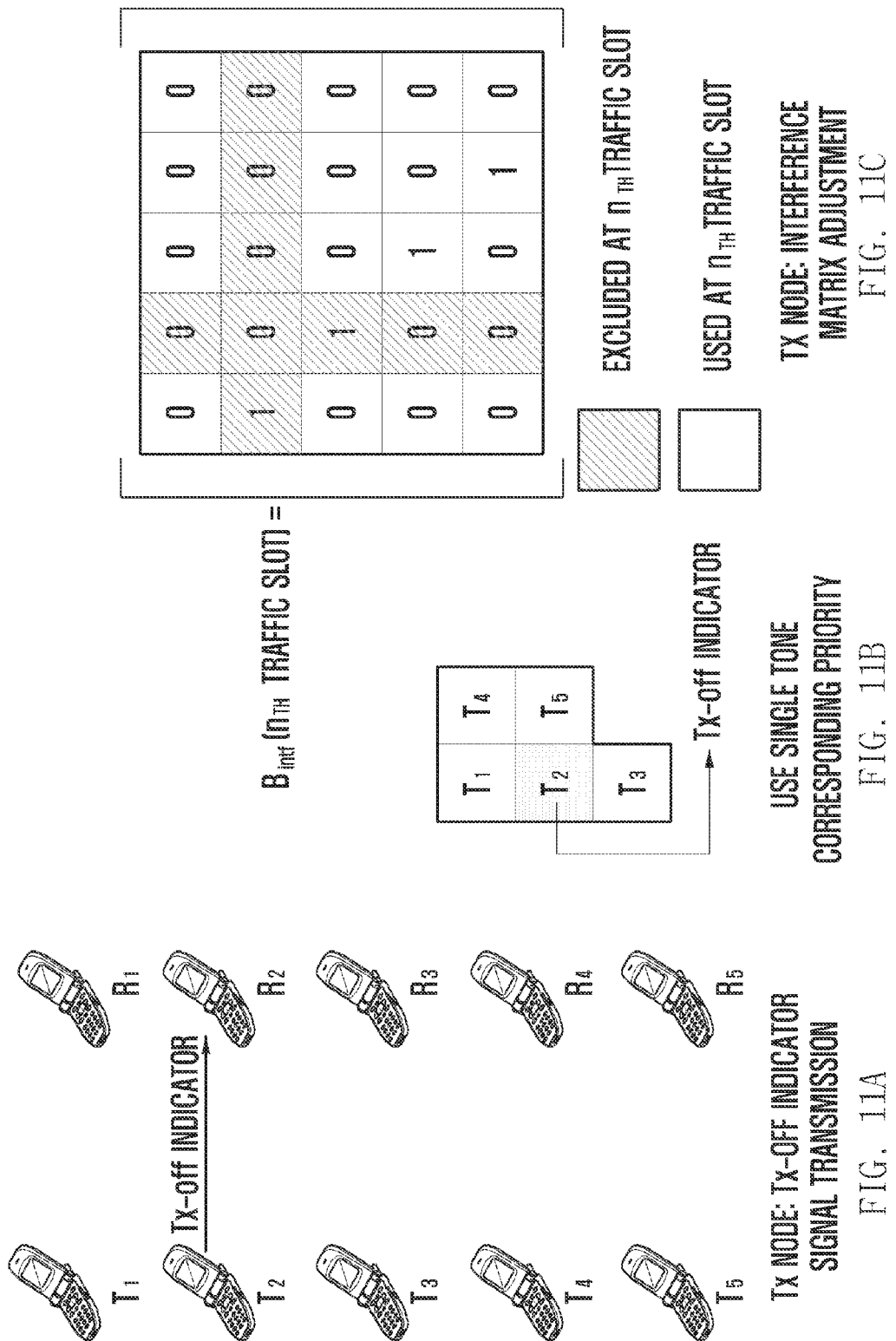

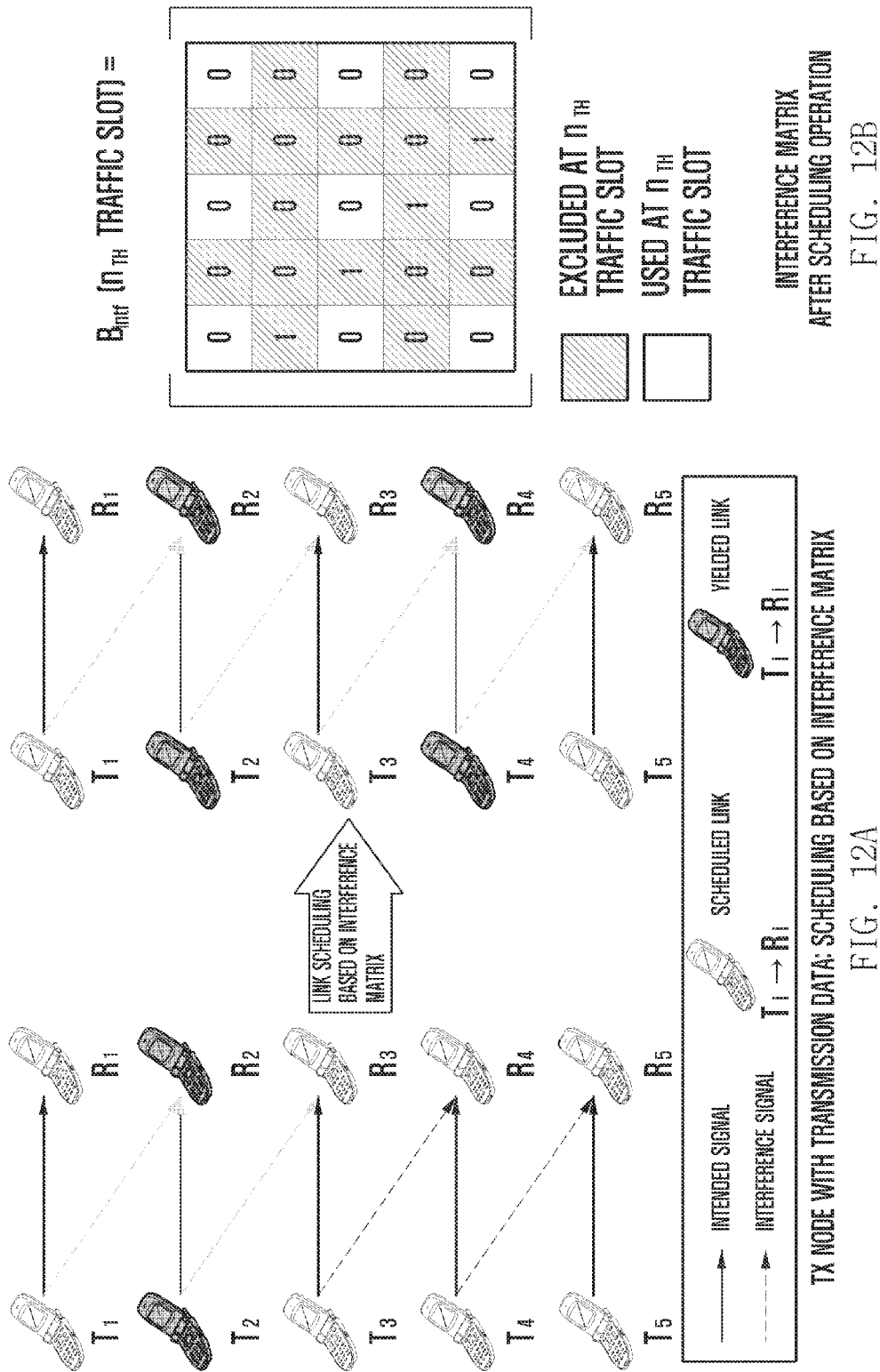

(a) v = 13.5 km/h = 3.75 m/s (fd = 30 Hz)

(a) v = 54 km/h = 15 m/s (fd = 120 Hz)

ically adjacent neighbor nodes and establishes a radio link with one of the identified neighbor nodes, if necessary, to communicate data. Such a procedure is performed between the nodes in a distributed manner without assistance of other network nodes. Accordingly, commercialization of the D2D communication is advantageous because the D2D communication network may be implemented without extra infrastructure as compared to other wireless communication networks.

INTER-LINK INTERFERENCE INFORMATION SHARING-BASED LINK SCHEDULING METHOD AND APPARATUS FOR USE IN WIRELESS COMMUNICATION SYSTEM

CROSS-REFERENCE TO RELATED APPLICATION(S)

This application claims the benefit under 35 U.S.C. §119 (a) of a Korean patent application filed on Aug. 17, 2012 in the Korean Intellectual Property Office and assigned Serial No. 10-2012-0090104, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) Research & Business Foundation SUNGKYUNKWAN UNIVERSITY.

TECHNICAL FIELD

The present disclosure relates to a wireless communication system. More particularly, the present disclosure relates to a link scheduling apparatus and method based on inter-link interference information sharing technique in a Device to Device (D2D) communication system.

BACKGROUND

In a Device to Device (D2D) communication network, a wireless node identifies geometrically adjacent neighbor nodes and establishes a radio link with one of the identified neighbor nodes, if necessary, to communicate data. Such a procedure is performed between the nodes in a distributed manner without assistance of other network nodes. Accordingly, commercialization of the D2D communication is advantageous because the D2D communication network may be implemented without extra infrastructure as compared to other wireless communication networks.

In addition, the D2D communication maintains data traffic locally so as to avoid traffic overload problems at a base station and an Access Point (AP). For this reason, standardization organizations such as $3^{rd}$ Generation Partnership Project (3GPP) and Institute of Electrical and Electronics Engineers (IEEE) are standardizing D2D communication based on the Long Term Evolution-Advanced (LTE-A) and Wi-Fi technologies. In addition, many companies are developing D2D communication technologies independently.

In the D2D communication network, the nodes establish D2D links among each other autonomously without assistance of any base station or AP for data communications. In this case, a distributed link scheduling method for determining radio resource and transmission timing on the plural D2D links influences the throughput of the D2D network significantly.

Recently, some network operators have proposed a distributed link scheduling method designed in consideration of Signal-to-Noise Ratio (SNR) on the links through single-tone search signal exchange based on Orthogonal Frequency Division Multiplexing (OFDM) signal structure in the synchronized radio environment. Such a method determines the transmission on each link in consideration of a predicted signal interference amount rather than a carrier sensing result. As a result, support for simultaneous transmission on the plural D2D links is possible, thereby resulting in an improvement of D2D communication throughput.

However, the distributed link scheduling technique according to the related art has a drawback in that each node makes a scheduling decision based on only that node's own channel information without consideration of the conditions of other nodes, thereby resulting in the degradation of the entire network efficiency.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address the above-mentioned problems and or disadvantages and to provide at least the advantages described below. Accordingly, an aspect of the present disclosure is to provide a link scheduling method based on the interference channel information among all links between all transmitter and receiver nodes in a Device to Device (D2D) wireless communication system.

Another aspect of the present disclosure is to provide a link scheduling method and apparatus that is capable of solving the continuous yielding problem in such a way of sharing local channel information on the respective links to generate the global channel knowledge to all links and performing link scheduling in consideration of other links' yielding situations acquired based on the global channel knowledge.

In accordance with an aspect of the present disclosure, a link scheduling method of a transmission node in a wireless communication system supporting direct communication between the transmission and recipient nodes is provided. The method includes receiving interference information of at least one recipient node from at least one recipient node, the interference occurring from at least one transmission node to at least one reception node, scheduling links based on the interference information; and transmitting data according to the scheduled links.

In accordance with another aspect of the present disclosure, a method for reporting interference information of a recipient node in a wireless communication system supporting direct communication between transmission and recipient nodes is provided. The method includes receiving a direct power signal transmitted by at least one transmission node, calculating Signal-to-Interference Ratio (SIR) in association with the at least one transmission node based on the direct power signal, generating interference information associated with each of the at least one transmission node based on the calculated SIR, broadcasting the interference information; and receiving data from the transmission node according to link scheduling determined based on the interference information.

In accordance with another aspect of the present disclosure, a transmission node of performing link scheduling in a wireless communication system supporting direct communication between transmission and recipient nodes is provided. The transmission node includes a radio communication unit configured to transmit and receive signals to and from at least one recipient node, and a control unit configured to control receiving interference information of at least one recipient node from at least one recipient node, the interference occurring from at least one transmission node to at least one reception node, scheduling links based on the interference information, and transmitting data according to the scheduled links.

In accordance with still another aspect of the present disclosure, a recipient node of reporting interference information in a wireless communication system supporting direct communication between transmission and recipient nodes is provided. The recipient node includes a radio communication unit configured to transmit and receive signal to and from at least one transmission node, and a control unit configured to control receiving a direct power signal transmitted by at least one transmission node, calculating Signal-to-Interference Ratio (SIR) in association with the at least one transmission node based on the direct power signal, generating interference information associated with each of the at least one transmission node based on the calculated ISR, broadcasting the interference information, and receiving data from the transmission node according to link scheduling determined based on the interference information.

Other aspects, advantages, and salient features of the present disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A and 8B illustrate a situation of generating and broadcasting interference information in an interference matrix generation period according to an embodiment of the present disclosure;

FIG. 9 is a diagram illustrating an interference matrix for use in a link scheduling method according to an embodiment of the present disclosure;

FIGS. 11A, 11B, and 11C illustrate an exemplary situation in which a second link has no data to be transmitted at a $n^{th}$ traffic slot according to an embodiment of the present disclosure;

FIGS. 12A and 12B illustrate an exemplary scheduling with an interference matrix adjusted to fit for an interference channel situation, such as, for example, the interference channel situation of FIG. 10 and traffic off (Tx-off) situation according to an embodiment of the present disclosure;

Throughout the drawings, it should be noted that like reference numbers are used to depict the same or similar elements, features, and structures.

DETAILED DESCRIPTION

Figure 1:
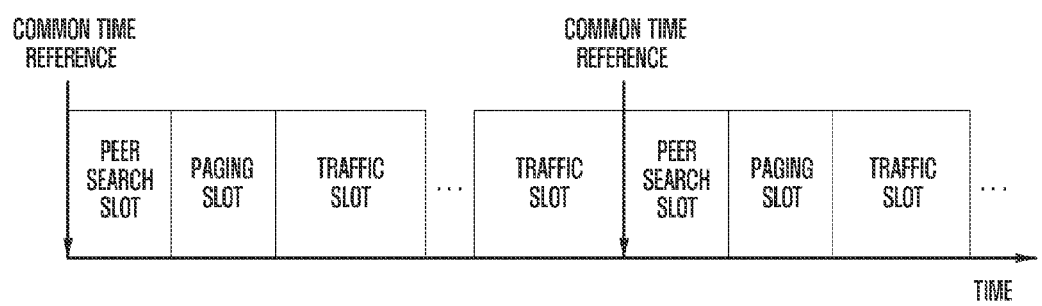
FIG. 1 is a diagram illustrating a cyclic communication timing structure for use in a Device to Device (D2D) communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces Various embodiments of the present disclosure are directed to a Device to Device (D2D) communication network in which adjacent devices communicate with each other directly without any infrastructure such as, for example, a base station, an Access Point (AP), and/or the like.

Various embodiments of the present disclosure propose a link scheduling method and apparatus for use in a D2D communication network. The link scheduling technique is a procedure of determining a link for communication at a given time slot based on the current traffic and channel state on each D2D link. Through the link scheduling procedure, the D2D network is capable of minimizing interference between links and reusing the same resource efficiently.

Particularly, various embodiments of the present disclosure relate a technique for increasing the communication throughput of the D2D network performing a distributed scheduling without control of a base station. However, as described later in the specification of the present disclosure, the involvement of base stations is not ruled out. In the method according to the related art, each node performs scheduling based on only the channel information that the particular node receives directly without consideration of the situations of other nodes, resulting in degradation of entire network efficiency.

Various embodiments of the present disclosure aim to solve problems associated with the distributed scheduling, and relate to the technology for increasing the network communication throughput in the tendency of increasing data traffic with the popularity of smartphones.

Recently, a radio communication technology capable of supporting D2D communication within the range of 1 km is under standardization. The D2D communication can be performed between two nodes by generating single-tone Orthogonal Frequency Division Multiple Access (OFDMA) within the range of 1 km.

According to various embodiments of the present disclosure, the D2D communication is directly performed between the devices through the processes of peer search, paging, scheduling, and data transmission as shown in FIG. 1.

FIG. 1 is a diagram illustrating a cyclic communication timing structure for use in a D2D communication system according to an embodiment of the present disclosure.

Referring to FIG. 1, the peer search slot and the paging slot have relatively long periods, and the traffic slot for scheduling and data transmission appears several times (e.g., a plurality of traffic slots appear) for the duration of the paging slot.

In the D2D communication system according to various embodiments of the present disclosure, the D2D communication link is established by a base station through peer search and paging processes, and each link is assigned Connection Identifier (CID) for scheduling.

As shown in FIG. 1, the traffic slot appears repeatedly. The traffic slot is the duration for which scheduling is performed on the links assigned CID and data are transmitted. The detailed structure of the traffic slot is depicted in FIG. 2.

Figure 2:
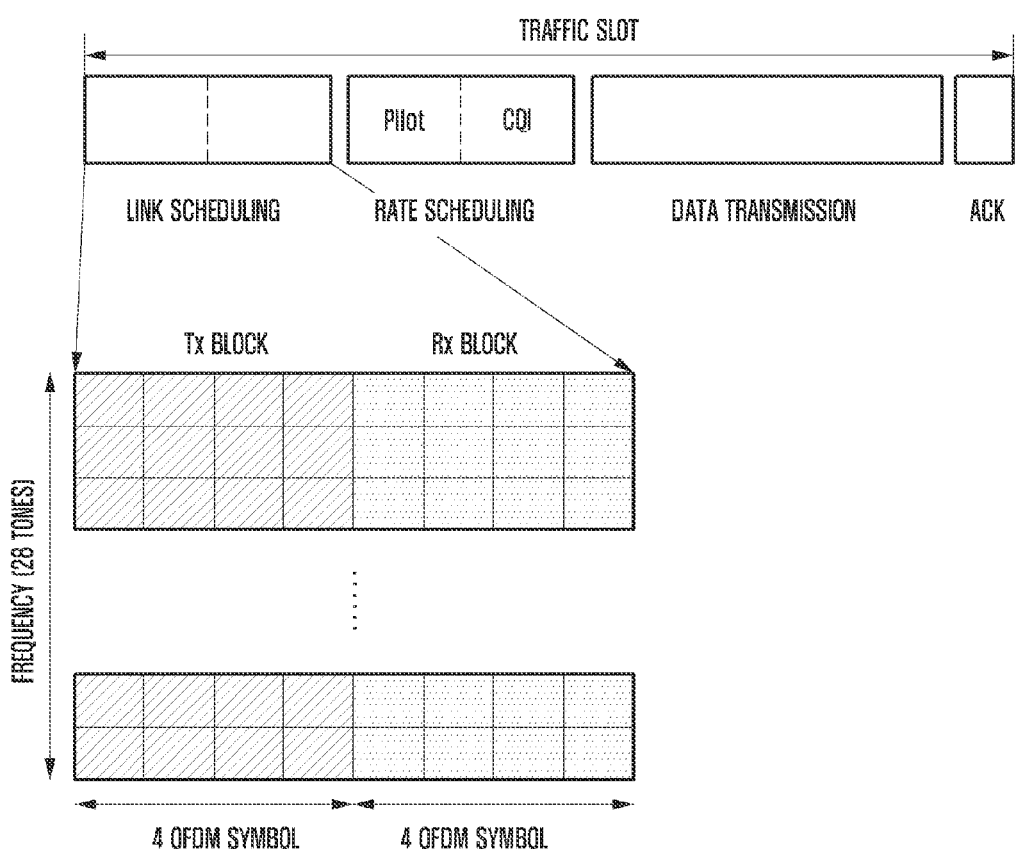
FIG. 2 is a diagram illustrating a logical structure of a traffic slot such as, for example, the traffic slot of FIG. 1, according to an embodiment of the present disclosure.

FIG. 2 is a diagram illustrating a logical structure of a traffic slot such as, for example, the traffic slot of FIG. 1 according to an embodiment of the present disclosure.

Referring to FIG. 2, the logical structure of the traffic slot includes link scheduling, rate scheduling, data transmission, and ACKnowledgement (ACK) transmission processes. In the D2D communication, the devices directly communicate with each other through such processes without assistance of a base station.

The traffic slot has a period shorter than that of the pear search or paging slot and appears at least one time before the next paging slot. According to various embodiments of the present disclosure, the traffic slot may appear repeatedly before the next paging slot.

A description is made of the link scheduling procedure in the traffic slot hereinafter.

The link scheduling process included in the traffic slot is the process of determining the link for communication at a given time slot based on the current traffic and channel state of each channel. Through the link scheduling procedure, the D2D network may minimize interference among the links and may reuse the same resource efficiently. The D2D communication technology may improve the resource reuse rate while guaranteeing the quality of each link. In order to improve the resource reuse rate without compromising the link quality, according to various embodiments of the present disclosure, the D2D communication technology proposes a single-tone OFDM channel-based analog transmission request/response signaling method and a distributed scheduling method based on Signal-to-Interference Ratio (SIR) as described hereinafter.

Single-Tone Signal Generation

In a signal structure for link scheduling, the links established through the paging process are assigned a transmission (Tx) block and a reception (Rx block) for link scheduling according to the allocated CID as shown in FIG. 2. Each link is assigned a pair of Tx and Rx blocks, and the Tx node and Rx node transmit the information on the link to be scheduled with the Tx and Rx blocks.

For example, if each of the Tx and Rx blocks includes N OFDM symbols and F frequency tones, up to N*F links may be assigned CIDs to participate in the scheduling procedure. According to various embodiments of the present disclosure, one traffic slot may include multiple Tx-Rx blocks pairs and obtaining more accurate scheduling result using more Tx-Rx blocks pairs in one traffic slot is possible.

The Tx node of the D2D link broadcasts a single-tone analog transmission request signal in the Tx block. At this time, each link is mapped to a single tone at a certain position among N*F tones according to the CID. The position of the single-tone indicates the priority which is highest (lowest) at the top left (bottom right) tone. For example, when one OFDM symbol includes 32 frequency tones, the D2D links having the priorities of 1 and 32 transfer the transmission request signal using the first frequency tone of the first OFDM symbol and the fourth frequency tone of the second OFDM symbol in Tx block, respectively.

The recipient node of D2D link listens to the signals of all Tx blocks and determines the availability of D2D communication based on the signals to broadcast the transmission response signal at the same tone position of the Rx block. The Tx node also listens to the signal of the Rx blocks that are broadcast by the Rx node. Using such a single-tone OFDM signal generation method, the link scheduling is performed on all D2D links in the way of minimizing interference based on the signal transmitted by the counterpart node.

SIR-Based Distributed Operation: Rx-Tx Yielding

The links on which the D2D communication sessions have been established are allocated priorities as well as CIDs. The link allocated the highest priority may always transfer traffic data, and the links allocated relatively low priorities may analyze the interference relationship with the links allocated higher priority to determine whether to transmit data. For example, the analyzing, by links allocated relatively low priorities, of the interference relationship with the links allocated higher priority to determine whether to transmit data corresponds to a method of determining communication on the low priority link depending on the interference with the links having the priority higher than that of the low priority link.

The method of determining communication on the low priority link depending on the interference with the links having the priority higher than that of the low priority link can be classified into one of Rx yielding considering the interference from the high priority node to the low priority node, and one of Tx yielding considering the interference from the low priority node to the high priority node. The priority is allocated randomly at every traffic slot to guarantee fairness between D2D links. Although the priorities are generated randomly at each node in a distributed manner, the priorities are allocated according to the same rule of CID function so as to prevent the links from being allocated the same Tx-Rx block.

A description is made of the Rx yield and Tx yielding with reference to FIGS. 3A and 3B hereinafter.

Figure 3A:
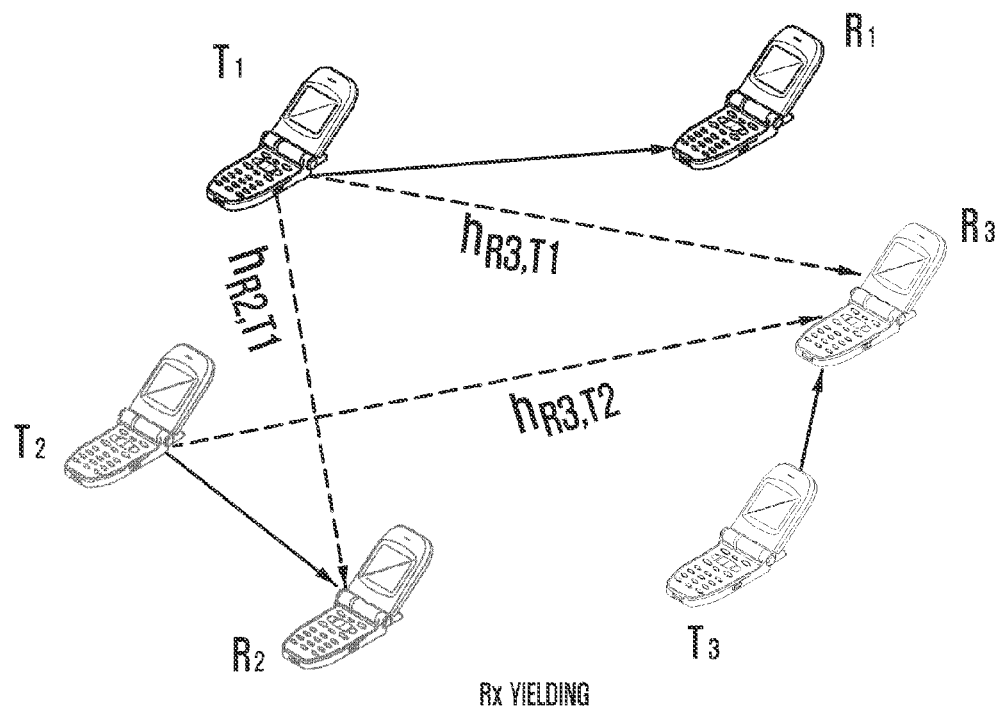
FIG. 3A is a diagram illustrating reception (Rx) yielding in a situation with plural D2D links according to an embodiment of the present disclosure.

FIG. 3A is a diagram illustrating Rx yielding in a situation with plural D2D links according to an embodiment of the present disclosure. FIG. 3B is a diagram illustrating transmission (Tx) yielding in a situation with plural D2D links according to an embodiment of the present disclosure.

[Rx Yielding] Tx: Transmit Direct Power Signal—Rx: Check Presence of Rx Yielding Referring to FIG. 3A, the Rx yielding includes two steps at which the Tx node broadcasts analog signal in the Tx block allocated according to the Tx node's CID and the Rx node determining the presence of Rx yield based on the broadcast signal received in the Tx block.

At the first step, each Tx node transmits a transmission request signal in the Tx block allocated according to the single-tone OFDM signal generation scheme. The transmission request signal is the analog signal transmitted at the same power ($P_i$, i=1, 2, 3) as the real traffic data transmission and referred to as direct power. As illustrated in FIG. 3A, assuming that the three D2D links are allocated priorities 1~3 respectively, each Tx node transmits a direct power signal thereof in 1-3 Tx blocks.

At the second step, each Rx node of D2D link listens to the direct power signal in the Tx blocks, calculates the SIR based on the Tx power on the Tx link thereof and the interference power from high priority Tx nodes, and compares the calculated value with a certain threshold value to determine the presence/absence of Rx yielding. For example, the Rx node 3 measures the direct power of the analog signal received in the Tx block allocated to the Tx node 1 and 2 to check (e.g., determine) the interference from the links having priorities higher than the priority thereof and calculates SIR using in Equation (1):

$$\frac{|h_{R3,T3}|^2 P_3}{\sum_{j=1}^{2} |h_{R3,Tj}|^2 P_j} > \gamma_{Rx} \qquad \text{Equation (1)}$$

In Equation (1), $h_{Ri,Tj}$ denotes the channel gain between $j^{th}$ Tx node and $i^{th}$ Rx node.

If the calculated SIR is greater than the threshold $\gamma_{Rx}$, the Rx node 3 determines that the interference from the D2D nodes 1 and 2 are tolerable so as to transmit the transmission response signal in the Rx block. However, the SIR is equal to or less than the threshold $\gamma_{Rx}$, the Rx node 3 does not transmit the transmission response signal. This means that efficient data transmission is impossible in the current traffic slot due to the storing interference from the high priority nodes so as to yield the communication right to other link.

The procedure of performing, at the low priority Rx node, SIR measurement/comparison with interference from the higher priority nodes and determining whether to transmit the transmission response signal is referred to as Rx yielding. For example, the Rx yielding corresponds to the procedure of determining whether it is possible for the Rx node to receive data while guaranteeing the minimum SIR in spite of the interference from the high priority links.

[Rx Yielding] Non-Rx Yielding Rx: Transmit Inverse Power Signal—Tx: Check Presence/Absence of Tx Yielding Referring to FIG. 3B, Tx yielding includes a step of broadcasting, at the non-Rx yielding (fulfilling inequality (1)) Rx nodes, the analog signal in inversely proportional to the interference from the Tx nodes in the Rx block allocated according to CID, and of determining, at the Tx node, presence/absence of Tx yielding.

The Tx node performs Tx yielding in the Rx block similar to the Rx yielding basically. If the presence of interference from the high priority node to the low priority node is determined in the Rx yielding, a determination is made, in the Tx yielding, as to whether the communication stability on the high priority link is guaranteed in spite of the interference caused by the Tx node itself. As illustrated in FIG. 3B, if all the three links have high SIR as compared to the Rx yielding, the link 3 Tx node determines whether to perform communication in consideration of the interference to the high priority Rx nodes 1 and 2.

At the first step of the Tx yielding, all non-yielding Rx nodes transmit the transmission response signal at the power ($\tilde{P}_i$(i=1, 2, 3)) in inversely proportional relation to the direct power transmission power received at the corresponding tone of the Tx block. Such an analog transmission response signal is referred to as inverse power signal. The Rx node with priority i transmits the signal at the power of Equation (2) using the $i^{th}$ tone.

$$\tilde{P}_i = \frac{A}{|h_{Ri,Ti}|^2 P_i} \qquad \text{Equation (2)}$$

In Equation (2), A denotes the system constant a positive real number.

At the second step, each Tx node of the D2D link listens to the inverse power in the Rx blocks, calculates SIR value of the interference power to the high priority Rx node having no signal addressed to the Tx node, compares the calculated SIR with a threshold value to determine whether to perform Tx yielding.

Figure 3B:
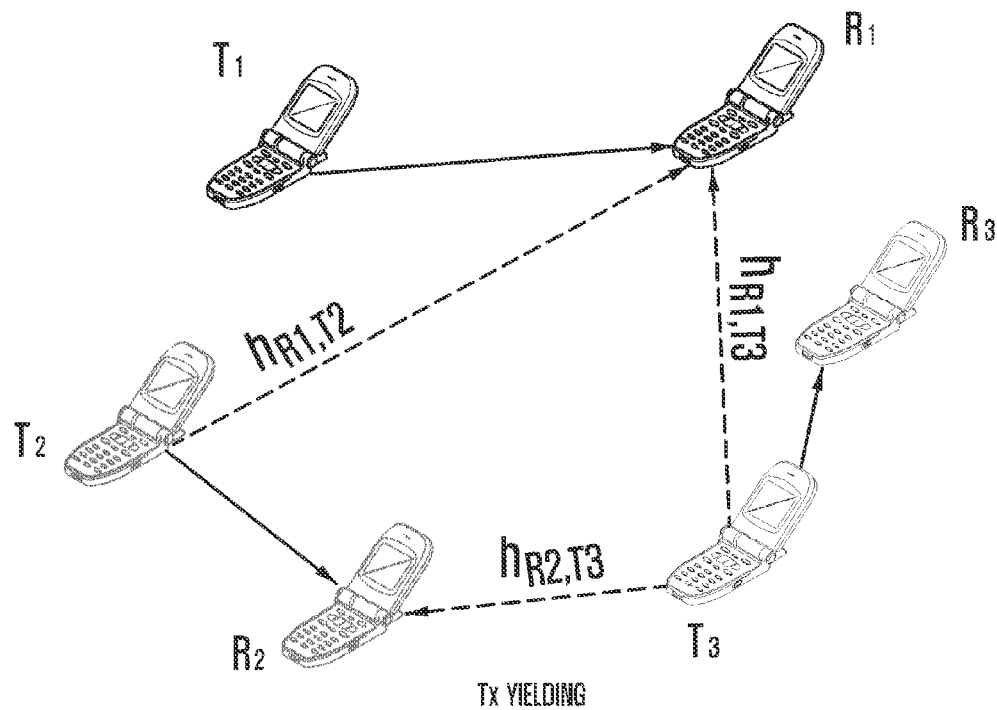
FIG. 3B is a diagram illustrating transmission (Tx) yielding in a situation with plural D2D links according to an embodiment of the present disclosure.

Referring to FIG. 3B, if the Rx nodes 1 and 2 transmit the transmission response signal, the Tx node 3 receives the signals with powers $|h_{T3,R1}|^2 \tilde{P}_1$ and $|h_{T3,R2}|^2 \tilde{P}_2$ on the tones 1 and 2. Thereafter, the Tx node 3 estimates SIRs at the Rx nodes of the D2D links 1 and 2 in association with the interference it causes. It is assumed that the two channel gains of $h_{T3,Ri}$ and $h_{Ri,T3}$ are equal to each other. The Tx node 3 compares SIR with the threshold and, if all $SIR_i (i=1,2,)$ fulfill the above condition, transmit the data in the data transmission duration of the traffic slot.

$$SIR_i = \frac{1}{|h_{T3,Ri}|^2 \tilde{P}_i} \times \frac{A}{P_3} = \frac{|h_{Ri,Ti}|^2 P_i}{|h_{T3,Ri}|^2 P_3} > \gamma_{Tx} \quad \text{Equation (3)}$$

This procedure of estimating, at the Tx node, the SIR of the high priority node and determining whether to transmit data is referred to as Tx yielding. The Tx yielding is a procedure of determining whether to receive data while guaranteeing the minimum SIR in spite of the interference from the low priority link.

The above described link scheduling technique of the D2D communication is a distributed link scheduling according to SIR based on the priority. However, such a method has a drawback in that at least one low priority link is yielded sequentially by the high priority link yielded due to the execution with only the local channel knowledge (cascade yielding problem). The cascade yielding problem is described with reference to FIG. 4 hereinafter.

Figure 4:
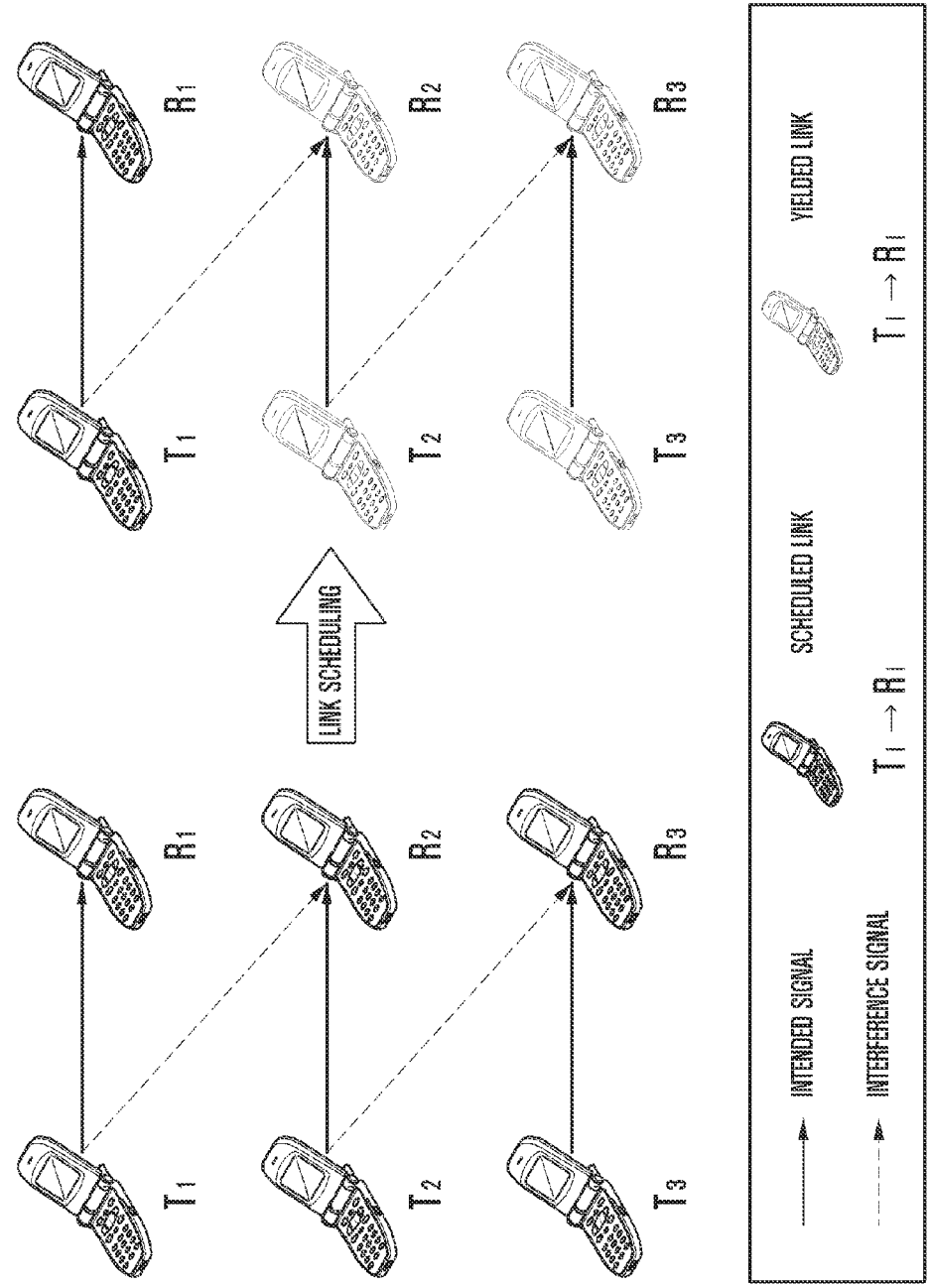
FIG. 4 is a diagram illustrating a D2D environment having three links for explaining a cascade yielding problem according to an embodiment of the present disclosure.

FIG. 4 is a diagram illustrating a D2D environment having three links for explaining a cascade yielding problem according to an embodiment of the present disclosure.

Referring to FIG. 4, Ti and Ri are Tx and Rx nodes having the $i^{th}$ priority respectively, and the dotted line arrow indicates interferences greater than the threshold value so as to cause yielding on the low priority link.

In the following, the definition of 'interference signal' explained in the description on the proposed technology, according to various embodiments of the present disclosure, is used. In the scheduling of D2D communication, the link 2 measures the interference level of the link 1 having the priority higher than a priority thereof to determine whether to yield transmission, and the link 3 measures the interference levels of the links 1 and 2 to determine whether to yield transmission.

As illustrated in FIG. 4, the link 2 yields due to the interference from the link 1, and the link 3 yields due to the interference from the link 2. For example, the data transmissions on the links 1 and 2 are yielded. Although the first and third links have no interference relationship, the link 3 has no information on the situation of the link 2 so as to attempt yielding and thus only the link 1 is scheduled (e.g., corresponding to data traffic transmission).

Such a cascade yielding problem is likely to occur frequently as the number of links increases in the network.

Although various methods are proposed to solve this problem, the efficiency of those methods is low due to the lack of consideration of states of other links.

Various embodiments of the present disclosure have been conceived to solve this problem and aims to mitigate the cascade yielding problem of the technology according to the related art through a link scheduling in consideration of the yielding situations of other links based on the global channel knowledge distributed to the entire links by sharing local channel information allocated to each link.

Various embodiments of the present disclosure specified for accomplishing the above aim are applicable to the radio communication node capable of D2D communication. Each recipient (Rx node) generates the interference signal based on the received link transmission signal and broadcasts the interference signal such that all the transmitters are aware of the interference situation of other links. By sharing the interference information, minimizing (e.g., or at least reducing) unnecessary yielding is possible, thereby resulting in improvement of a resource reuse rate and a communication throughput.

The link scheduling technique proposed according to various embodiments of the present disclosure is capable of allowing all Rx nodes distributed on the D2D network broadcast interference channel information respectively corresponding thereto, and each Tx node performs scheduling based on the interference channel information, thereby resulting in an improvement of resource reuse rate.

In order to accomplish the link scheduling technique proposed according to various embodiments of the present disclosure, adding a broadcast duration for generating and broadcasting, at each Rx node, the interference channel information to the basic D2D communication functional structure described with reference to FIGS. 1 and 2 is necessary. The proposed basic functional structure according to various embodiments of the present disclosure is described with reference to FIG. 5.

Figure 5:
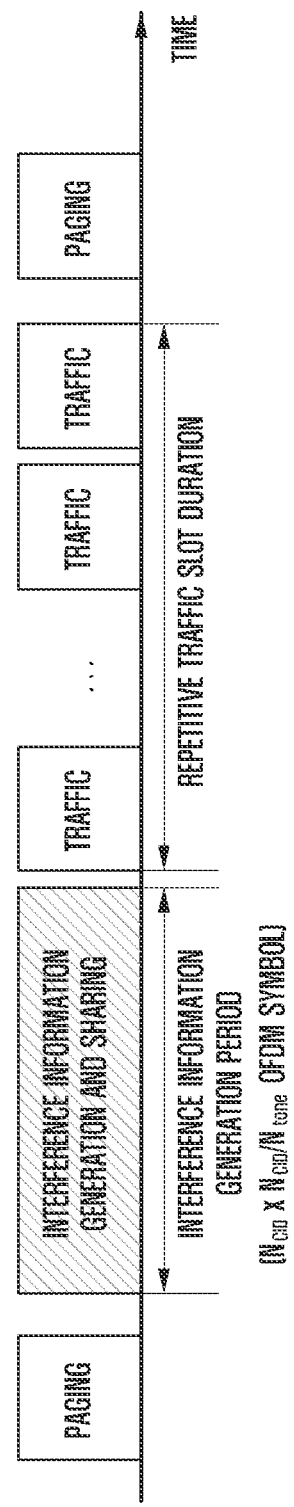
FIG. 5 is a diagram illustrating a basic functional structure proposed for use in a link scheduling method according to an embodiment of the present disclosure.

FIG. 5 is a diagram illustrating a basic functional structure proposed for use in a link scheduling method according to an embodiment of the present disclosure.

Referring to FIG. 5, the basic functional structure proposed for use in the link scheduling according to various embodiments of the present disclosure has an interference information generation and sharing slot between the conventional paging slot and traffic duration. In more detail, the interference information generation and sharing slot follows the paging slot for allocating CID to each link and consists of total $N_{CID}^2/N_{tone}$ OFDM symbols for sharing the interference channel information of all links. The NCID denotes total number of CIDs that can be allocated, and $N_{tone}$ denotes the total number of OFDM tones for use in scheduling. For example, if a total number of CIDs is 288 ($N_{CID}=228$) and if the number of available tones is 56 ($N_{tone}=56$), total 912 OFDM symbols can be used for sharing interference information.

The link scheduling operation according to various embodiments of the present disclosure can be focused on (1) the interference information generation and sharing slot (hereinafter, referred to as slot 1) and (2) the traffic slot (hereinafter, referred to as slot 2).

The interference information generation and sharing slot has a cyclic period varying depending on the changing speed of the D2D link channel, interference information sharing overhead, and bidirectional communication period. According to various embodiments of the present disclosure, it is assumed that the interference information generation and sharing slot and traffic slots are positioned between two paging slots as shown in FIG. 5 for simplicity purpose. However, various embodiments of the present disclosure are not limited thereto.

Between two paging slots, the interference information generation and sharing slot is followed by at least one traffic slot, and each traffic slot has the interference information shared through the interference information generation and sharing slot at a beginning thereof.

Figure 6:
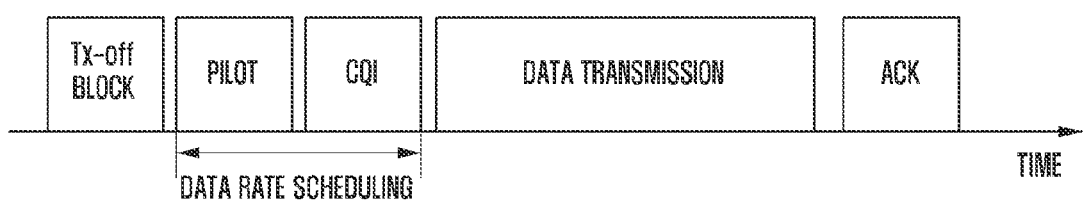
FIG. 6 is a diagram illustrating a structure of a traffic slot such as, for example, the traffic slot of the basic functional structure of FIG. 5 according to an embodiment of the present disclosure.

FIG. 6 is a diagram illustrating a structure of a traffic slot such as, for example, the traffic slot of the basic functional structure of FIG. 5 according to an embodiment of the present disclosure.

Referring to FIG. 6, the structure of the traffic slot according to an embodiment of the present disclosure includes a Tx-off block indicating whether the current traffic slot has the traffic data to be transmitted rather than Tx and Rx blocks for transmitting and receiving the transmission request and response signals in the legacy D2D communication. A detailed description thereon is made later in association with the operation at each slot.

In the following, the link scheduling operation according to various embodiments of the present disclosure is described in association with respective slots. Slot 1 denotes the interference information generation and sharing slot, and slot 2 denotes the traffic slot.

[Slot 1—Step 1] all Tx Nodes: Transmit Direct Power Signal in First Tx Block

The description is made with reference to FIG. 7.

Figure 7B:
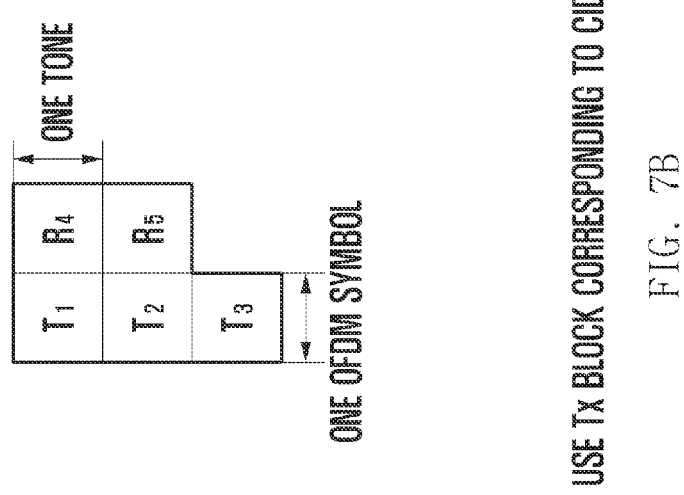
FIGS. 7A and 7B illustrate a situation in which each Tx node transmit direct power signal in a Tx block allocated with a Connection Identifier (CID) at an interference matrix generation duration according to an embodiment of the present disclosure.
Figure 7A:
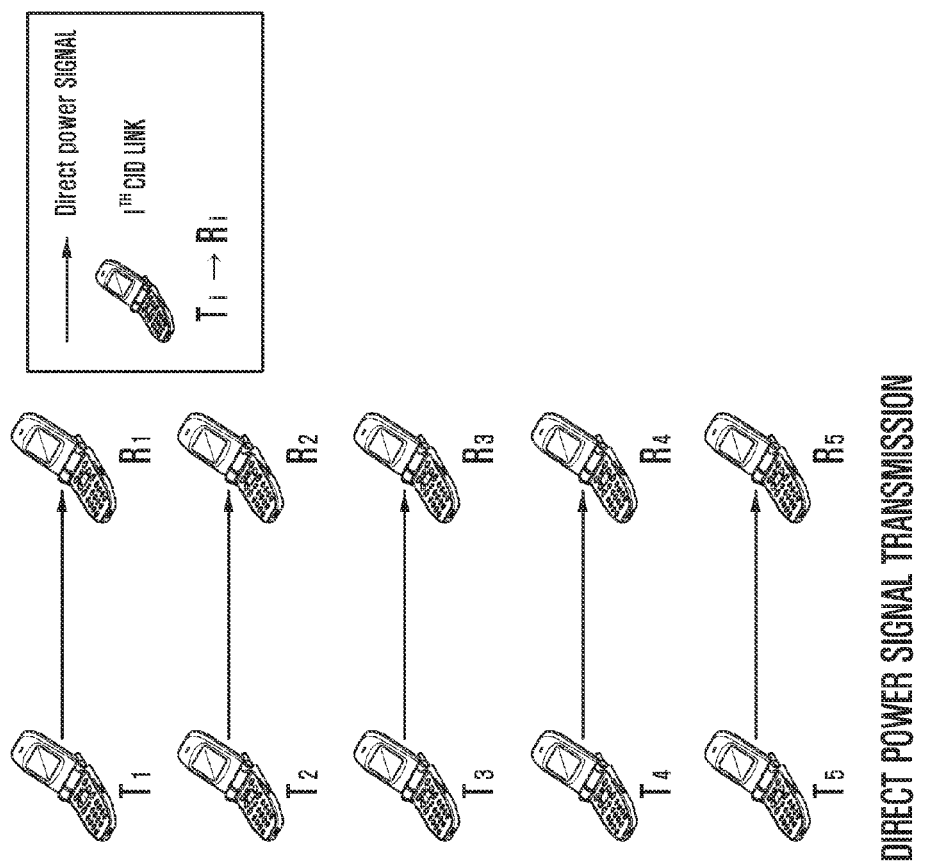

FIGS. 7A and 7B illustrate a situation in which each Tx node transmit direct power signal in a Tx block allocated with its CID at an interference matrix generation duration according to an embodiment of the present disclosure.

Referring to FIGS. 7A and 7B, all Tx nodes transmit the direct power signal. Each Tx node may transmit the direct power signal in the first Tx block.

Then the jth Rx node (Rd, j=1, 2, . . . , 5) calculates $SIR_{j,i}$ in association with all Tx nodes ($T_i$, i=1, 2, . . . , 5) based on the received direct power signal. In this case, $SIR_{j,I}$ between $j^{th}$ Rx node (Rd) and $i^{th}$ Tx node is calculated by Equation (4):

$$SIR_{j,i} = \frac{P_j \cdot |h_{j,j}|^2}{P_i \cdot |h_{j,i}|^2} \left( = \frac{D_j}{I_{j,i}} \right)$$  Equation (4)

$P_k$ denotes the transmission power of the kth Tx node, and $h_{j,i}$ denotes a channel coefficient between Rd and T.

[Slot 1—Step 2] all Rx Nodes: Generate and Broadcast Interference Information

Step 1 is described with reference to FIG. 8.

FIGS. 8A and 8B illustrate a situation of generating and broadcasting interference information in an interference matrix generation period according to an embodiment of the present disclosure.

Referring to FIGS. 8A and 8B, after the slot 1-step 1, the Rx node measures interference strengths from all Tx nodes and generates the information on the interference from the $i^{th}$ Tx node to the $k^{th}$ Rx node according to inequality (5). γ denotes the threshold value for use in the scheduling test.

If $SIR_i < \gamma, b_k(i)=1$ else, $b_k(i)=0$  Equation (5)

The Rx node is capable of generating the interference information in the form of a bit sequence (hereinafter, referred to as interference bit sequence) through the above procedure. The Rx node also broadcasts the generated interference information using the given interference information-sharing duration and resource.

FIG. 8A illustrates a case of generating interference information of R3 when the number of links is 5, and FIG. 8B illustrates the interference information broadcast by each Tx node.

As illustrated in FIG. 8B, each Rx node broadcasts the generated interference bit sequence $\{b_{j,i}\}$ using the pre-allocated interference information sharing resource. $R_j$ uses NCID OFDM symbols at the $j^{th}$ single-tone position for sharing the interference information with other nodes ($N_{ap}$ is greater than $N_{one}$, $(nN_{tone}+k)^{th}$ Rx node (n=1, 2, . . . ; k<$N_{tone}$) uses $N_{CID}$ symbols of $(nN_{CID}+1)^{th}$ OFDM symbols at $k^{th}$ single-tone position).

As illustrated in FIG. 8A, the Rx node R3 measures the intended signal and interference signal powers to calculate $SIR_{3,i}$(i=1, . . . , 5). The R3 compares the $SIR_{3,i}$ with a threshold value, generates an interference bit sequence $\{b_{3,i}\}$ based on the comparison result, and transmits the binary bit $b_{3,i}$ using 5 OFDM symbols sequentially at the third tone as illustrated in FIG. 8B. Other nodes also perform the same interference information generation and sharing procedure.

[Slot 1—Step 3] all Tx Nodes: Generate Interference Matrix

All the Tx nodes monitor the interference information sharing resource to acquire the interference bit sequence $\{b_{j,i}\}$ broadcast by NCID Rx nodes. Although the interference bit sequences acquired at the respective transmission nodes can be stored in various ways, various embodiments of the present disclosure are directed to a method for storing the interference bit sequences in the form of an interference matrix as shown in FIG. 9.

FIG. 9 is a diagram illustrating an interference matrix for use in a link scheduling method according to an embodiment of the present disclosure.

Referring to FIG. 9, with regard to the interference matrix, the component $b_{j,I}$ at the $j^{th}$ row and $i^{th}$ column denotes the interference information between $j^{th}$ Rx node and $i^{th}$ Tx node.

In the interference information generation and sharing slot, all the Tx nodes share the interference matrix having the same values.

In the traffic slot following the interference information generation and sharing slot, the link scheduling is performed using the interference matrix generated as illustrated in FIG. 9. After a predetermined period, the interference information generation and sharing slot operation is repeated to update the interference matrix.

Figures 10A, 10B:
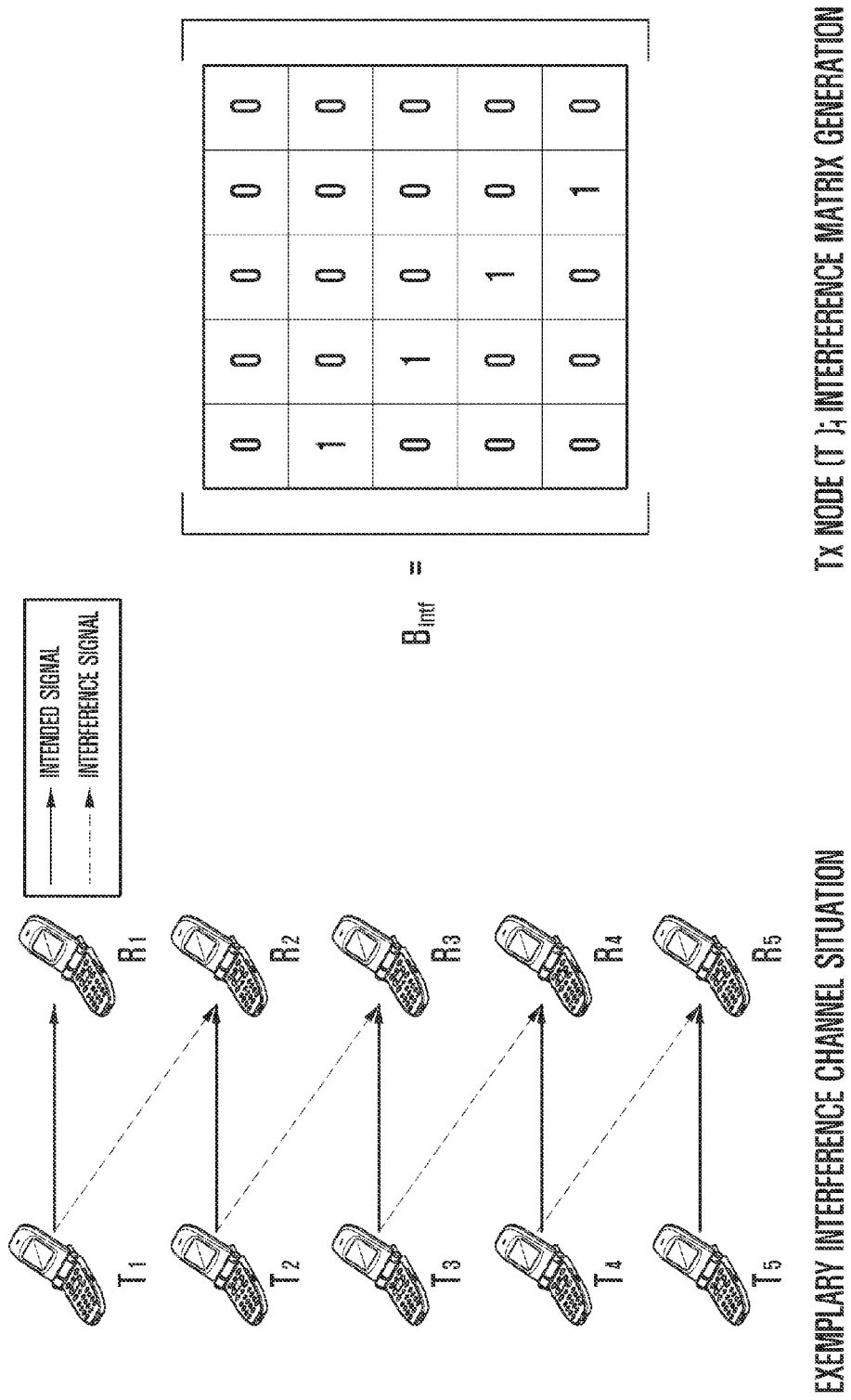
FIGS. 10A and 10B illustrate an interference channel situation with 5 links and an interference matrix thereof for use in a link scheduling method according to an embodiment of the present disclosure.

FIGS. 10A and 10B illustrate an interference channel situation with 5 links and an interference matrix thereof for use in a link scheduling method according to an embodiment of the present disclosure.

Referring to FIGS. 10A and 10B, the RX node 2 (R2) receives interference from the Tx node 1 (T1) such that the bit value of the component at second row and first column of the interference matrix is set to 1. Likewise, the Rx node 3 (R3) receives the interference from the Tx node 2 (T2) such that the bit value of the component at the third row and second column of the interference matrix is set to 1. FIG. 10B illustrates the interference matrix generated according to this principle.

[Slot 2—Step 1] Tx Node with No Tx Data (Ti No Data): Broadcast Tx-OFF Indicator (TI) Signal In the traffic slot, each Tx node determines whether to yield using the priority generated with its CID function and the interference matrix. However, the link of which data buffer is empty or which has no data to be transmitted has to be ruled out in the yielding process before the determination on yielding because such links do not cause interference to other links at the current slot.

According to an embodiment of the present disclosure, the Tx node having the traffic to be transmitted transmits the traffic-off (Tx-off) indicator signal at the first step of the traffic slot. The Tx nodes having the data to be transmitted receives the Tx-off indicator to identify the D2D link which is not used in traffic communication based on the Tx-off indicator. The Tx nodes having the data to be transmitted adjusts the interference matrix to include the interference information on the links with the exception of the identified links.

FIGS. 11A, 11B, and 11C illustrate an exemplary situation in which a second link has no data to be transmitted at an $n^{th}$ traffic slot according to an embodiment of the present disclosure.

Referring to FIGS. 11A, 11B, and 11C, index I denotes priority and the CID is assumed indicates the priority for simplifying the explanation.

The Tx node having the priority 2 broadcasts the traffic off indicator using the corresponding single-tone. Thereafter, the other Tx nodes monitor the Tx-off resources so as to be aware that the second link is not used for traffic communication and adjust the interference matrix for ruling out the influence of the second link. In this case, the interference matrix adjustment process is performed in such a way of adjusting the components of the second row and column to 0 temporarily or ruling out the components of the second row and column.

[Slot 2—Step 2] Tx Node Having Data to be Transmitted: Perform Scheduling and Transmit Traffic Meanwhile, the Tx nodes having the data to be transmitted performs link scheduling using the interference matrix adjusted at the previous step.

FIGS. 12A and 12B illustrate an exemplary scheduling with an interference matrix adjusted to fit for an interference channel situation, such as, for example, the interference channel situation of FIG. 10 and traffic off (Tx-off) situation according to an embodiment of the present disclosure.

Referring to FIG. 12A, as a consequence of the link scheduling with the interference matrix according to the corresponding embodiment, the fourth priority link yields, and first, third, and fifth priority links transmit traffic data.

FIG. 12B illustrates a structure of the interference matrix determined finally through such an association. As illustrated in FIG. 12B, all the row and column components having the value 1 indicating interference are deleted.

Comparing the final link scheduling result according to various embodiments of the present disclosure and the technology according to the related art, the number of simultaneous communication links increases according to various embodiments of the present disclosure as compared to the technology according to the related art. Considering increased number of links as compared to the various embodiments of the present disclosure, it is expected that the performance gain of the proposed scheduling method is improved.

The priority of each link is changed at every traffic slot to guarantee the fairness among the links. The priority is generated as a function to the CID, all Tx nodes are aware of the changed priorities of the other CID links as well as its own priority. Accordingly, each Tx node corrects the row and column positions of the interference matrix according to the priority changed at every traffic slot. The link scheduling is followed by data rate scheduling and traffic data transmission subsequently.

Hereinabove, the description has been directed to the link scheduling method in the D2D communication network (e.g., direct communication between devices). However, the above described method can be applied to the D2D system with cooperative base station as described hereinafter.

Figure 13:
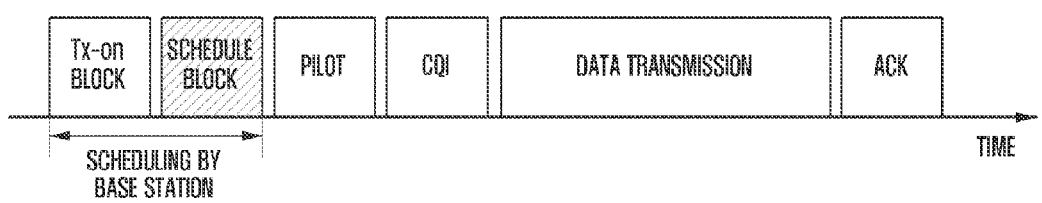
FIG. 13 is a diagram illustrating a structure of a traffic slot in a case of applying base station-cooperative system according to an embodiment of the present disclosure.

FIG. 13 is a diagram illustrating a structure of a traffic slot in a case of applying base station-cooperative system according to an embodiment of the present disclosure.

Referring to FIG. 13, the scheduling technology using the interference matrix as proposed in the present disclosure can be modified such that the scheduling link is designated based on the interference matrix received from the base station other than perform scheduling in the distributed manner by receiving, at the Tx node, the interference information transmitted by the Rx nodes.

Although such a technical modification requires an additional transmission block (scheduling block) as illustrated in FIG. 13, the base station designates a Tx node (e.g., control D2D communication) so as to prevent the D2D communication from degrading the performance of the legacy cellular communication.

Figure 14:
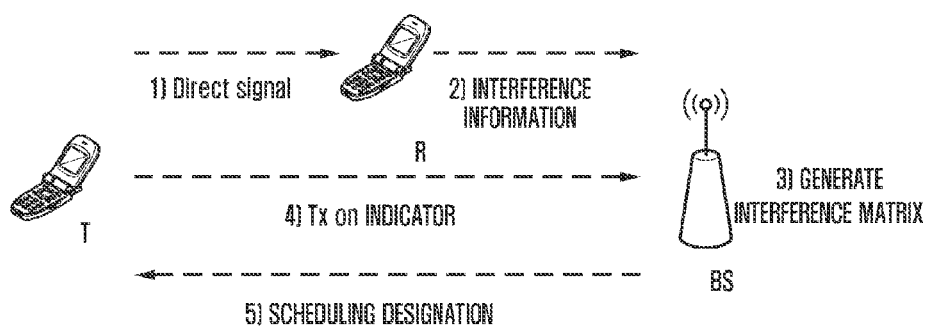
FIG. 14 is a diagram illustrating operations of distinct slots in stepwise manner in a base station-cooperative D2D system according to an embodiment of the present disclosure.

Brief descriptions are made of the operations of distinct slots in stepwise manner in the base station-cooperative D2D system with reference to FIG. 14.

FIG. 14 is a diagram illustrating operations of distinct slots in stepwise manner in a base station-cooperative D2D system according to an embodiment of the present disclosure.

[Slot 1—Step 1]

This step is identical with the corresponding step of the D2D communication system described above. Accordingly, a detailed thereon is omitted herein.

[Slot 1—Step 2] Rx Node: Generate and Transmit Interference Information

The step at which the Rx node measures the interference strengths from all the Tx nodes to generate the interference information is identical with the above description with the exception of transmitting, at the Rx node, the interference information other than broadcasting the interference information.

[Slot 1—Step 3] Base Station: Generate Interference Matrix

This steps differs from the above description in that the base station, instead of the Tx node, monitors the interference information resource to generate the interference matrix.

[Slot 2—Step 1] Tx Node: Transmit Tx-on Indicator and Adjust Interference Matrix Because there is a base station unlike the situation of determining the link having the traffic data among the legacy distributed links, the Tx node having the data to be transmitted transmits the traffic-on (Tx-on) indicator.

[Slot 2—Step 2] Base Station: Perform Scheduling and Transmit Scheduling Indicator Signal The base station broadcasts the finally determined scheduling indicator to indicate the scheduling link.

[Slot 2—Step 3] Scheduled Rx Node: Transmit Traffic Data

Thereafter, the Tx node scheduled by the base station transmit the traffic data according to the scheduling information.

Figure 15:
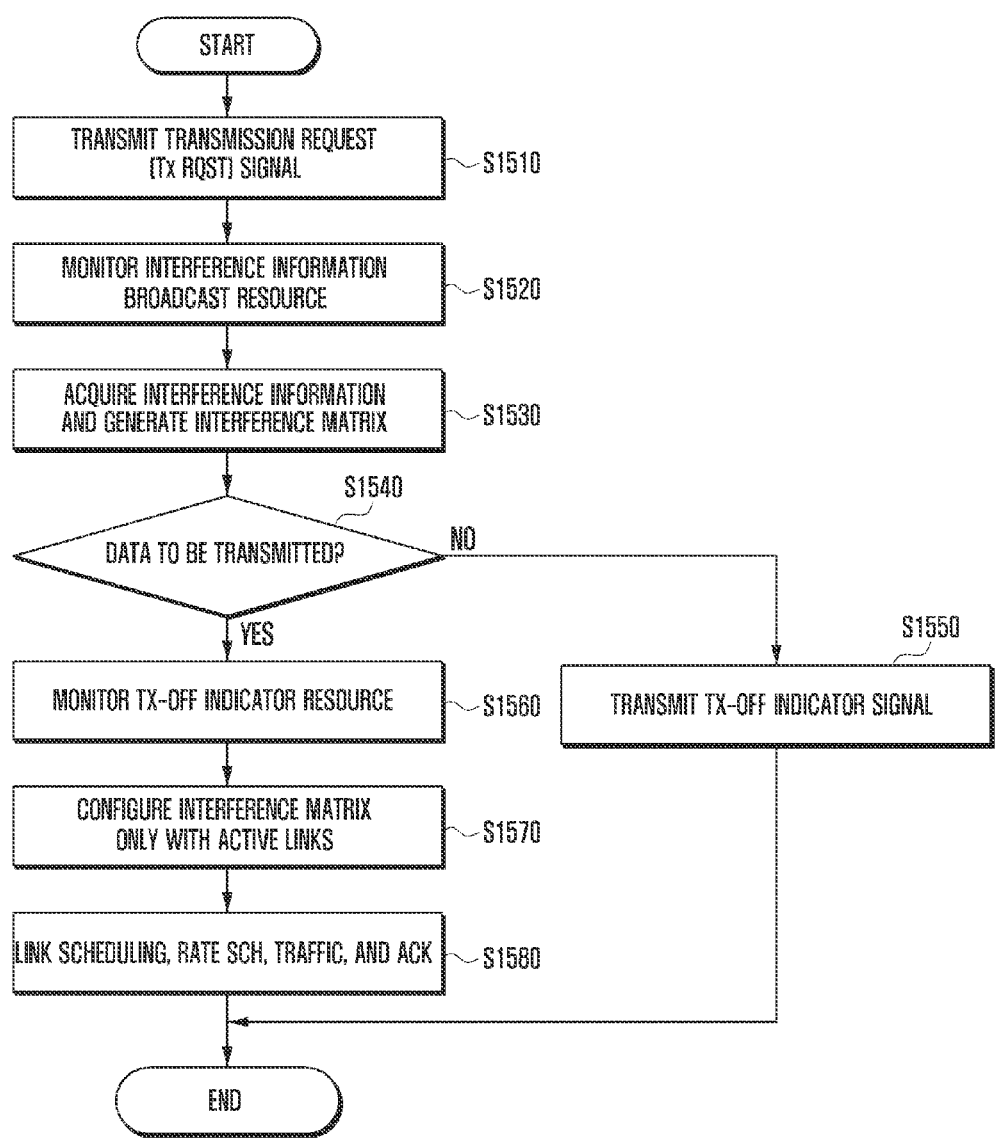
FIG. 15 is a flowchart illustrating a Tx node procedure of a link scheduling method according to an embodiment of the present disclosure.

FIG. 15 is a flowchart illustrating a Tx node procedure of a link scheduling method according to an embodiment of the present disclosure.

At operation S1510, the Tx node transmits a single-tone analog transmission request signal in the Tx block.

At operation S1520, the Tx node monitors the interference information broadcast resource to acquire the interference information transmitted by the Rx node.

thereafter, at operation S1530, the Tx node acquires the interference information from the Rx node. According to various embodiments of the present disclosure, the interference information may be transmitted in the form of a bit sequence. The Tx node is capable of storing the acquired interference information in various ways and, according to various embodiments of the present disclosure, the interference information is assumed to be stored in the form of an interference matrix.

Next, at operation S1540, the Tx node determines whether the Tx node has the data to be transmitted in the current slot. As an example, the Tx node determines whether the Tx node has the data to be transmitted in the current slot because the link having the data to be transmitted does not causes interference to other links in the current slot.

If the Tx node determines that the Tx node does not have data to be transmitted at operation S1540, then the Tx node proceeds to operation S1550 at which the Tx node transmits the traffic off (Tx-off) indicator. The traffic off indicator is broadcast using a single-tone, and other Tx nodes adjust the interference matrix based on the indicator.

In contrast, if the Tx node determines that the Tx node has any data to be transmitted at operation S1540, then the Tx node proceeds to operation S1560 at which the Tx node monitors the traffic off indicator resource to determine whether a traffic off indicator is broadcast.

Thereafter, at operation S1570, the Tx node reconfigures the interference matrix only with the active communication links. For example, the Tx node reconfigures the interference matrix generated at operation S1530 by removing the links having no data to be transmitted.

After reconfiguring the interference matrix, at operation S1580, the Tx node performs link scheduling to transmit data.

Figure 16:
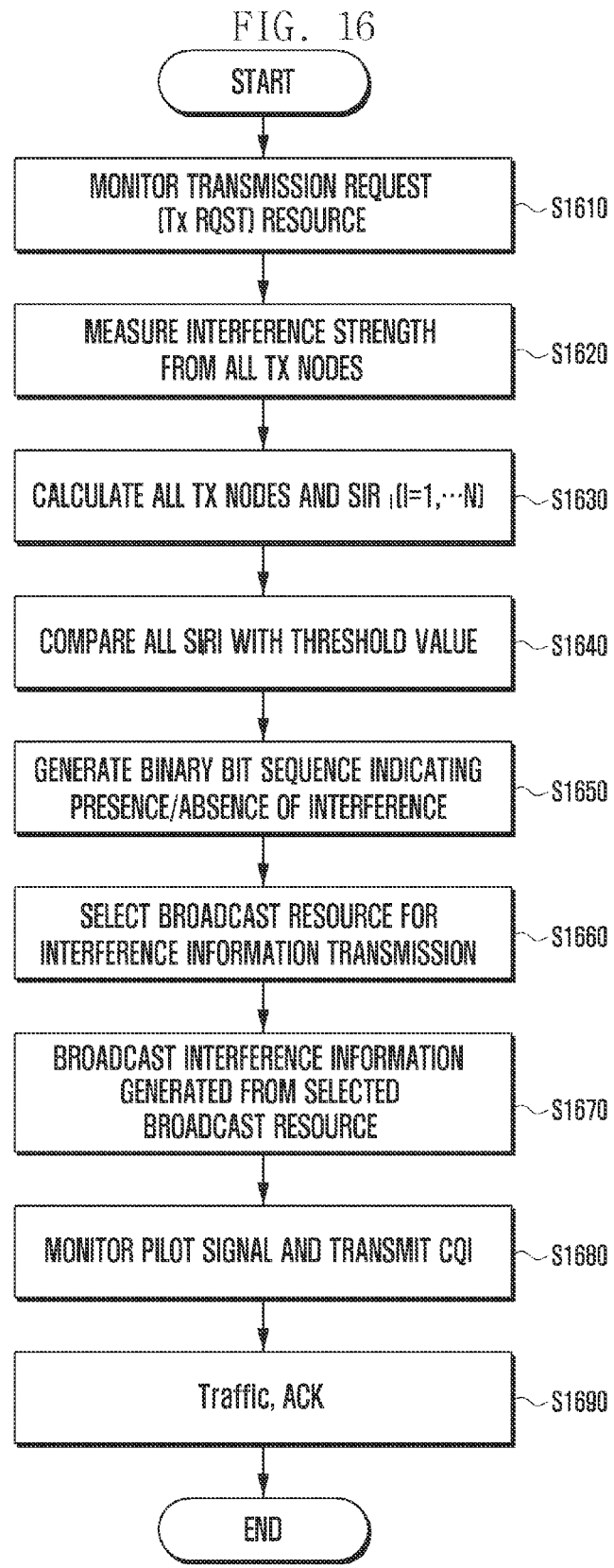
FIG. 16 is a flowchart illustrating an Rx node procedure of a link scheduling method according to an embodiment of the present disclosure.

FIG. 16 is a flowchart illustrating an Rx node procedure of a link scheduling method according to an embodiment of the present disclosure.

At operation S1610, the Rx node monitors the transmission request resource.

At operation S1620, the Rx node measures the interference strengths from all Tx nodes.

At operation S1630, the Rx node calculates SIR, associated with all TX nodes.

At operation S1640, the Rx node compares the SIR, with a threshold.

At operation S1650, the Rx node generates the interference information indicating the presence/absence of interference based on the comparison result. According to various embodiments of the present disclosure, the interference information is generated in the form of binary bit sequence.

At operation S1660, the Rx node selects the broadcast resource for broadcasting the generated interference information.

At operation S1670, the recipient node broadcasts the interference information using the selected broadcast resource.

At operation S1680, the recipient node monitors to detect the pilot signal transmitted by the Tx node and transmits Channel Quality Indicator (CQI).

At operation S1690, the Rx node receives the data traffic from the Tx node according to the link scheduling and, if the data traffic is received successfully, transmits the Acknowledgement (ACK) message.

Figure 17:
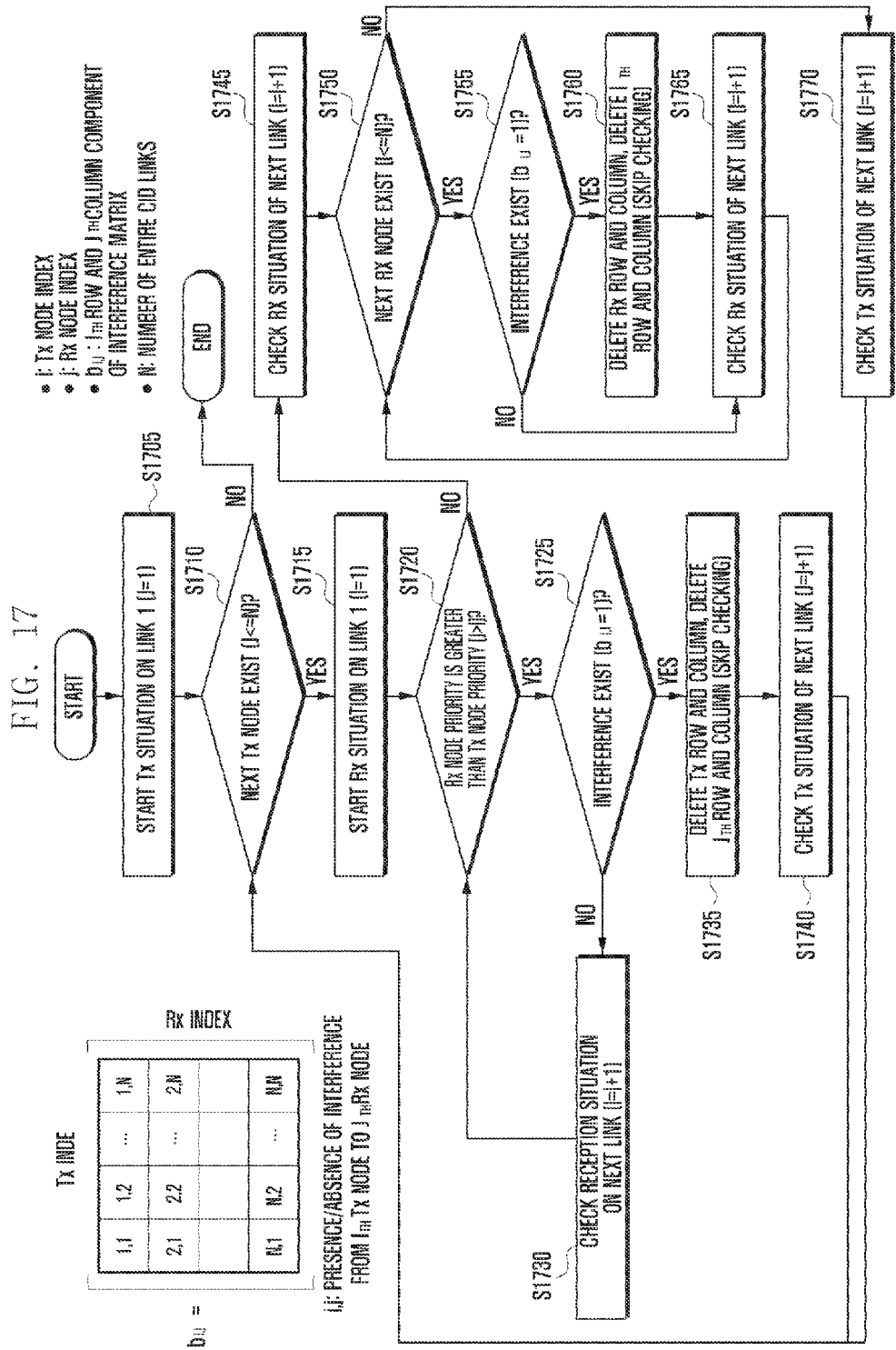
FIG. 17 is depicted under an assumption that a Tx node receives interference information from an Rx node to generate an interference matrix according to an embodiment of the present disclosure.

FIG. 17 is a flowchart illustrating a Tx node procedure of checking interference matrix for link scheduling according to an embodiment of the present disclosure.

Referring to FIG. 17, such a procedure to check (e.g., determine) all the interference situations between the TX and RX nodes in the current slot so as to prevent unnecessary yield from occurring is possible.

FIG. 17 is depicted under the assumption that the Tx node receives interference information from the Rx node to generate the interference matrix according to an embodiment of the present disclosure. In order to simplify the explanation, no Tx node is assumed to be transmitting the traffic off indicator in the current slot.

At operation S1705, the Tx node starts checking (e.g., determining) the transmission situation on the link 1.

At operation S1710, the Tx node determines whether a next Tx node exist.

If the Tx node determines that a next Tx node does not exist at operation S1710, then the Tx node ends the procedure.

In contrast, if the Tx node determines that a next Tx node does exist at operation S1710, then the Tx node proceeds to operation S1715 at which the Tx node starts checking (e.g., determining) reception state on the link 1.

At operation S1720, the Tx node determines whether the priority of the Rx node is higher than the priority of the Tx node.

If the Tx node determines that the priority of the Rx node is higher than the priority of the Tx node at operation S1720, then the Tx node proceeds to operation S1725 at which the Tx node determines whether there is any interference to the corresponding link.

If the Tx node determines that there is not any interference at operation S1725, then the Tx node proceeds to S1730 at which the Tx node checks (e.g., determines) a reception situation on a next link. Thereafter, the Tx node proceeds to operation S1720.

If the Tx node determines that there is any interference at operation S1725, then the Tx node proceeds to S1735 at which the Tx node removes the corresponding row and column from the interference node.

Thereafter, at operation S1740, the Tx node checks (e.g., determines) the transmission situation on the next link.

Thereafter, the Tx node returns to operation S1710 and performs subsequent operations.

If the Tx node determines that the priority of the Rx node is not greater than the priority of the Tx node at operation S1720, then the Tx node proceeds to operation S1745 at which the Tx node checks (e.g., determines) the reception situation on the next link.

Thereafter, at operation S1750, the Tx node determines whether a next Rx node exists (e.g., determines a presence/absence of the next Rx node).

If the Tx node determines that no next Rx node exists at operation S1750, then the Tx node proceeds to operation S1770 at which the Tx node checks (e.g., determines) the transmission situation on the next link.

In contrast, if the Tx node determines that a next Rx node exists at operation S1750, then the Tx node proceeds to operation S1755 at which the Tx node determines whether interference exists (e.g., the Tx node determines the presence/absence of interference).

If the Tx node determines that interference does not exists at operation S1755, then the Tx node proceeds to operation S1765 at which the Tx node checks (e.g., determines) the reception status of the next link.

In contrast, if the Tx node determines that interference exists at operation S1755, then the Tx node proceeds to operation S1760 at which the Tx node removes the row and column of the Rx node from the interference matrix.

Thereafter, at operation S1765, the Tx node checks (e.g., determines) the reception status of the next link.

Thereafter, the Tx node returns the procedure to operation S1750 to repeat subsequent operations.

As described above, the link scheduling method according to various embodiments of the present disclosure is capable of improving the D2D radio communication network through and resource reuse rate.

Figure 18:
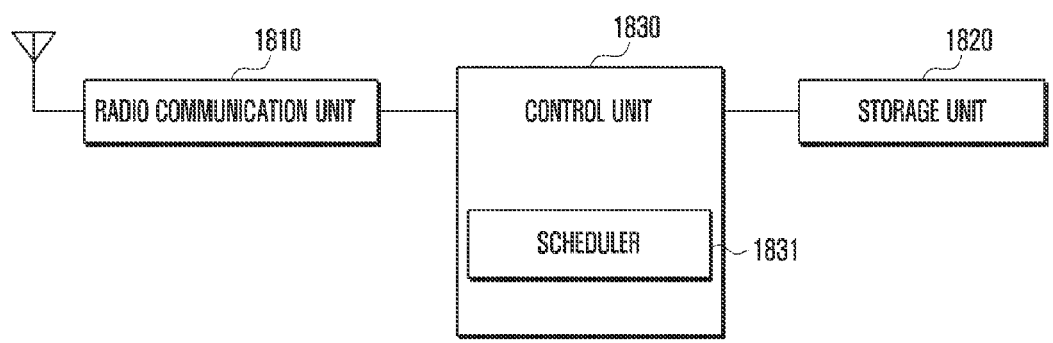
FIG. 18 is a block diagram illustrating a configuration of a Tx node according to an embodiment of the present disclosure.

FIG. 18 is a block diagram illustrating a configuration of a Tx node according to an embodiment of the present disclosure.

Referring to FIG. 18, the Tx node includes a radio communication unit 1810, a storage unit 1820, and a control unit 1830.

The radio communication unit 1810 may include a Radio Frequency (RF) transmitter configured to up-convert and amplify the transmission signals and an RF receiver configured to low noise amplify and down-convert the received signal. The radio communication unit 1810 transfers the data received over a radio channel to the control unit 1830 and transmits the data output from the control unit 1830 over the radio channel.

The storage unit 1820 stores the programs and data necessary for operations of the Tx terminal. According to various embodiments of the present disclosure, the storage unit 1820 may store the interference information received from the Rx node. According to various embodiments of the present disclosure, the interference information may store interference information in the form of an interference matrix.

The control unit 1830 controls the overall operations of the Tx node and signal flows among the function blocks of the Tx node. Particularly, the control unit 1830 according to various embodiments of the present disclosure may further include a scheduling unit 1831 for link scheduling.

The scheduling unit 1831 receives the information interference from at least one Rx node, the interference from at least one Tx node to at least one Rx node. Thereafter, the scheduling unit 1831 performs link scheduling based on the interference information. The scheduling unit 1831 transmits data according to the link scheduling result.

According to various embodiments of the present disclosure, the scheduling unit 1831 may receive the interference information in a binary bit sequence format from the Rx node. The scheduling unit 1831 generates an interference matrix based on the interference information and controls scheduling based on the interference matrix.

If a traffic-off indicator is received from a certain Tx node, the scheduling unit 1831 reconfigures the interference matrix by removing the components corresponding to the Tx node which has transmitted the traffic-off indicator. The scheduling unit 1831 may perform the link scheduling according to the reconfigured interference matrix.

The scheduling unit 1831 receives the interference information on the resource of the interference information generation and sharing slot following the paging slot.

Although the description is directed to the case in which the control unit 1830 and the scheduling unit 1831 are formed separately and responsible for different functions, such a configuration is described for the purpose of convenience and various embodiments of the present disclosure is not limited thereto. For example, a certain function of the scheduling unit 1831 may be performed by the control unit 1830 and this principle is applicable in the following description.

Figure 19:
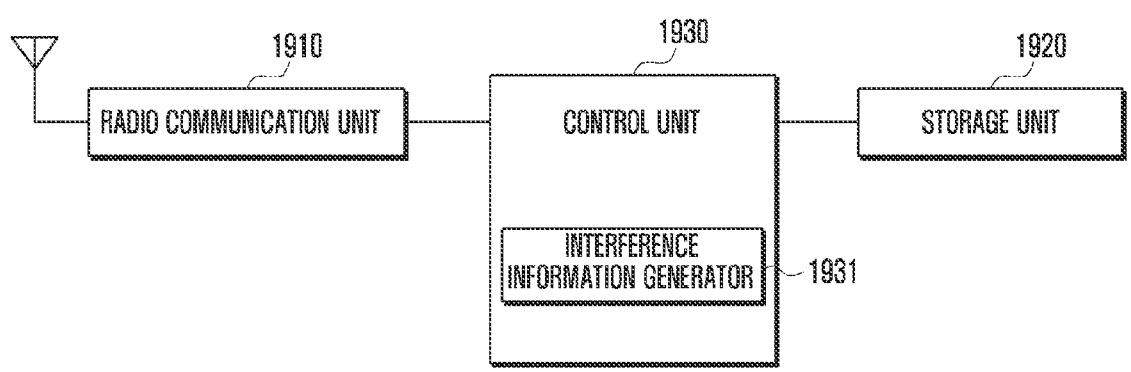
FIG. 19 is a block diagram illustrating a configuration of an Rx node according to an embodiment of the present disclosure.

FIG. 19 is a block diagram illustrating a configuration of an Rx node according to an embodiment of the present disclosure.

Referring to FIG. 19, the Rx node includes a radio communication unit 1910, a storage unit 1920, and a control unit 1930.

The radio communication unit 1910 is configured to transmit/receive radio signal carrying data. The radio communication unit 1910 may include a Radio Frequency (RF) transmitter configured to up-convert and amplify the transmission signals and an RF receiver configured to low noise amplify and down-convert the received signal. The radio communication unit 1910 transfers the data received over a radio channel to the control unit 1930 and transmits the data output from the control unit 1930 over the radio channel.

The storage unit 1920 is configured to store programs and data necessary for operations of the Rx terminal.

The control unit 1930 controls the overall operations of the Tx node and signal flows among the function blocks of the Rx node. Particularly, the control unit 1930 according to various embodiments of the present disclosure may further include a scheduling unit 1931 for link scheduling.

The interference information generator 1931 receives the direct power signal transmitted by at least one Tx node and calculates SIR in association with at least one Tx node based on the direct power signal. The interference information generator 1931 generates interference information on the at least one Tx node based on the calculation result, and broadcasts the interference information. The control unit 1930 controls the Rx node to receive the data from a certain Tx node according to the link scheduling determined based on the interference information.

In this case, the interference information generator 1931 is capable of generating the interference information in a binary bit sequence format. The interference information generator 1931 is also capable of comparing the calculated SIR with a predetermined threshold to generate the interference information.

According to various embodiments of the present disclosure, the interference information generator 1931 is configured to transmit the interference information to a base station.

Figure 20A:
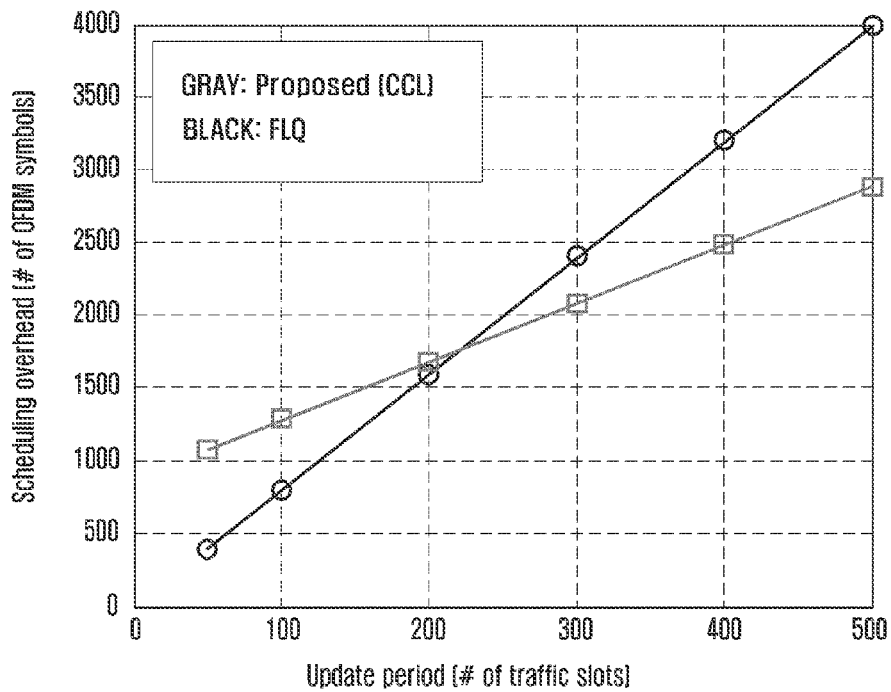
FIG. 20A illustrates a graph showing comparative results of a scheduling overhead in relation to an update period according to an embodiment of the present disclosure.

FIG. 20A illustrates a graph showing comparative results of a scheduling overhead in relation to an update period according to an embodiment of the present disclosure.

Figure 20B:
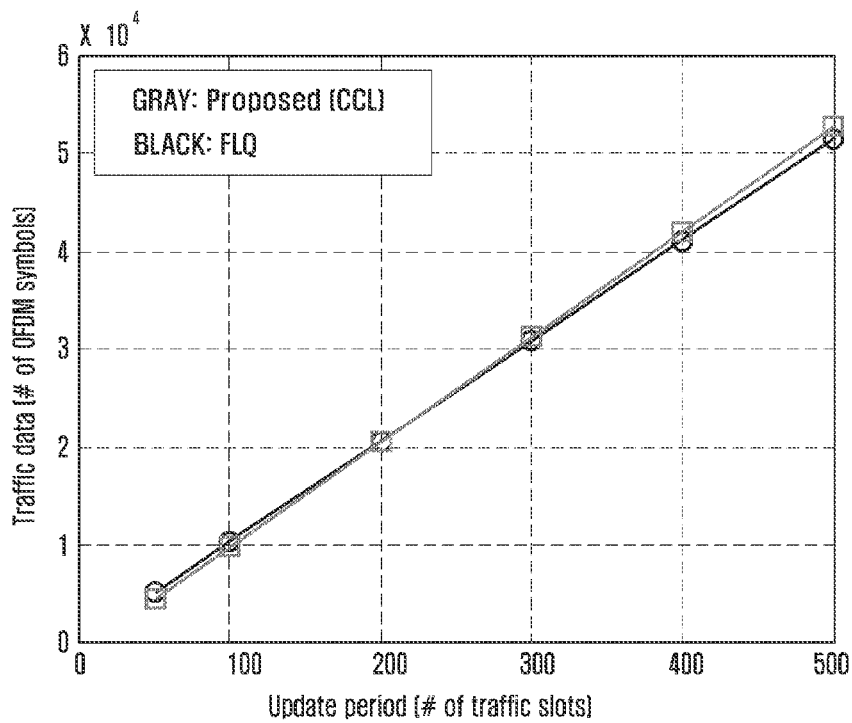
FIG. 20B illustrates a graph showing comparative results of traffic data in relation to an update period according to an embodiment of the present disclosure.

FIG. 20B illustrates a graph showing comparative results of traffic data in relation to an update period according to an embodiment of the present disclosure.

Figure 21A:
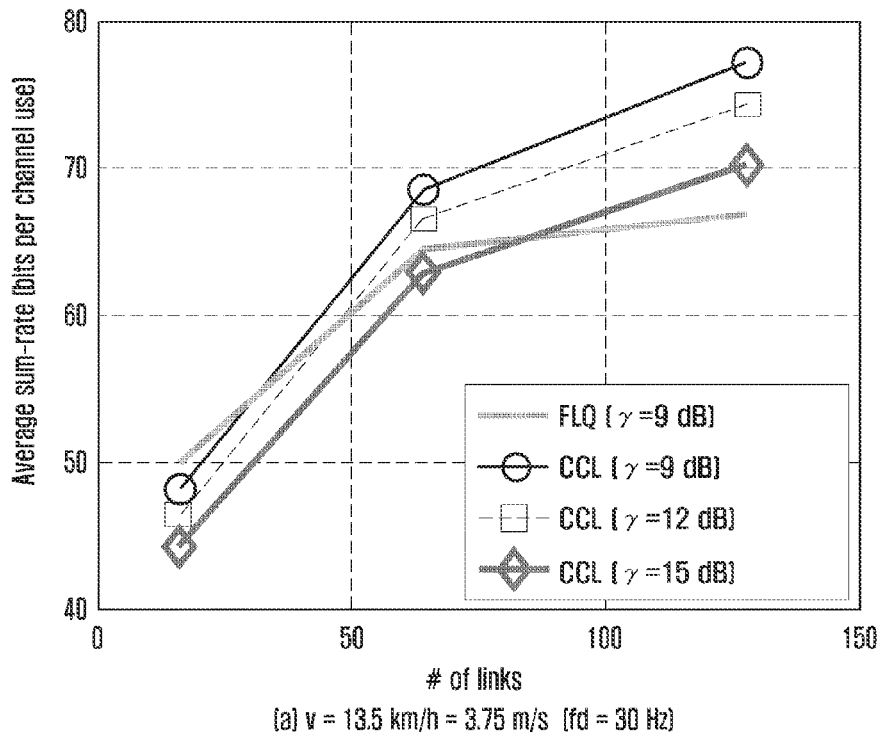
FIGS. 21A and 21B illustrate graphs showing comparative results of an average sum-rate (bits per channel use) in relation to a number of links according to an embodiment of the present disclosure.
Figure 21B:
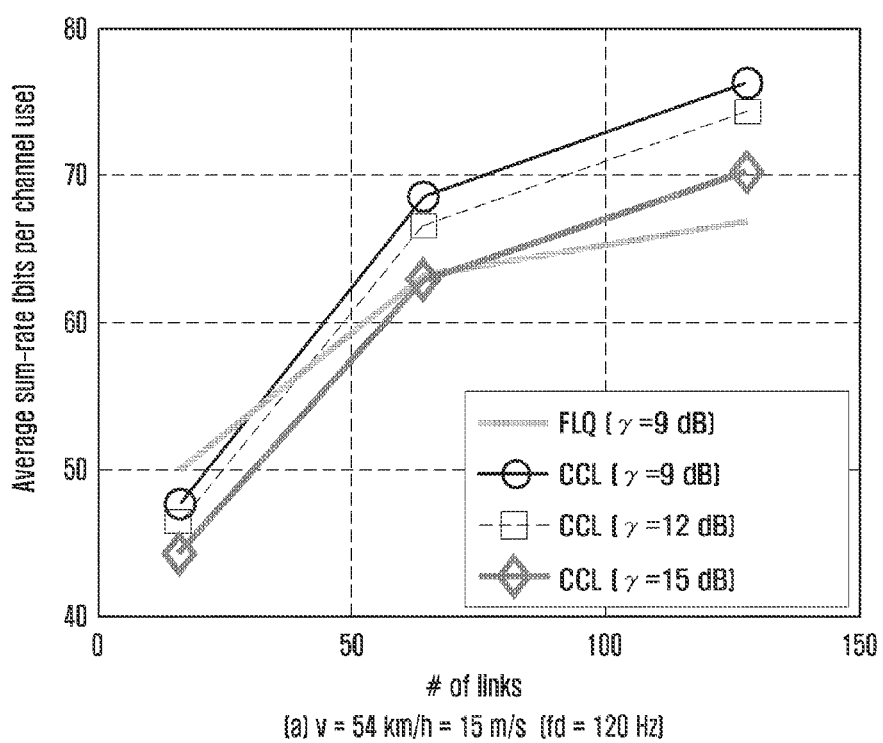

FIGS. 21A and 21B illustrate graphs showing comparative results of an average sum-rate (bits per channel use) in relation to a number of links according to an embodiment of the present disclosure.

Figure 22A:
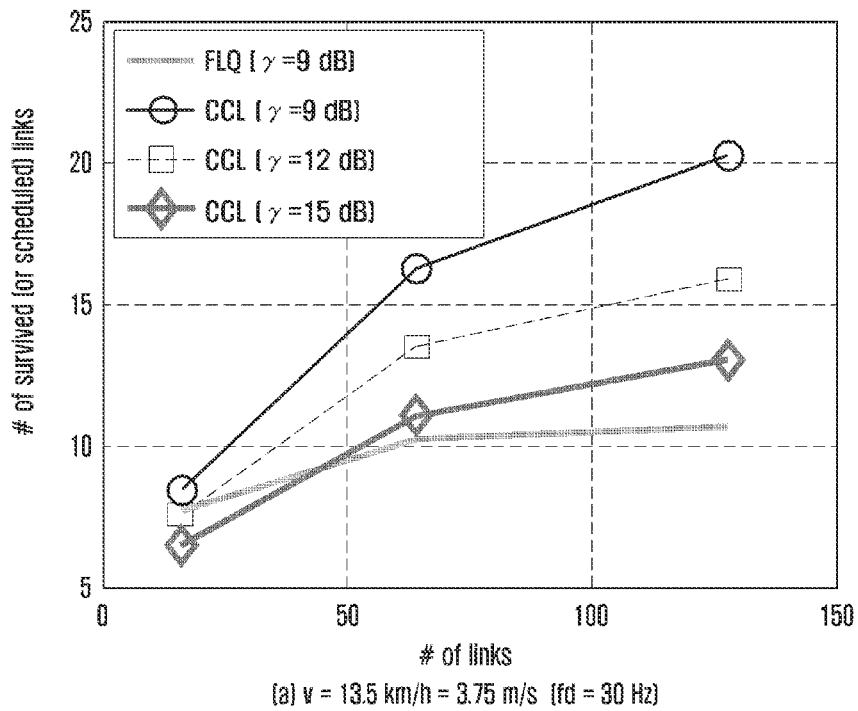
FIGS. 22A and 22B illustrate graphs showing comparative results of a number of survived or scheduled links in relation to a number of links according to an embodiment of the present disclosure.
Figure 22B:
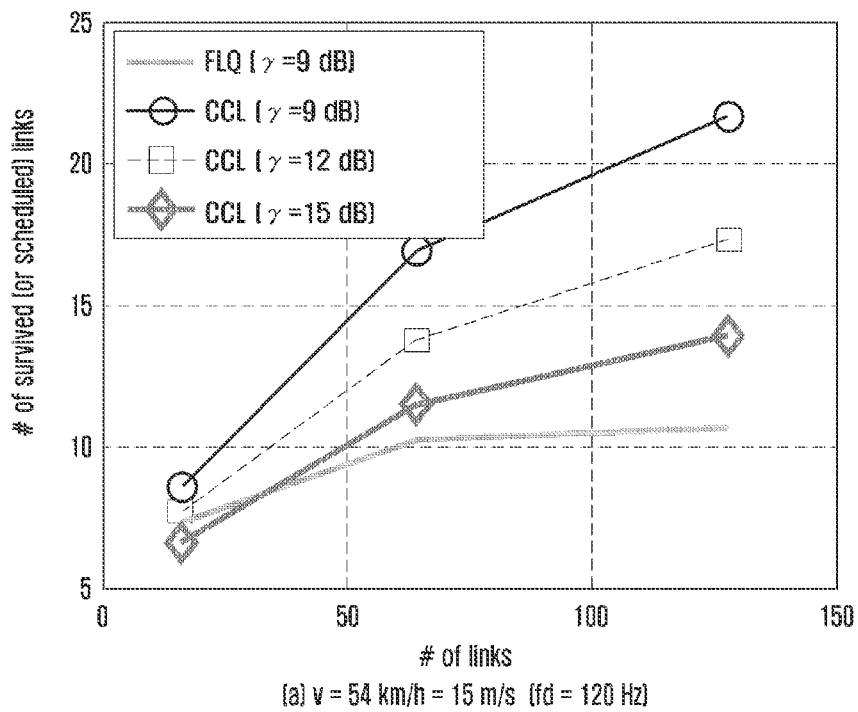

FIGS. 22A and 22B illustrate graphs showing comparative results of a number of survived or scheduled links in relation to a number of links according to an embodiment of the present disclosure.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

As described above, the link scheduling method according to various embodiments the present disclosure may allowing all Tx and Rx nodes to share the interference channel information on all links in a Device to Device (D2D) wireless communication system supporting direct communication between devices, thereby improving radio resource reuse rate and communication throughput of the D2D communication network.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a mobile transmission node in a wireless communication system supporting direct communication between mobile transmission nodes and mobile recipient nodes, the method comprising:
   transmitting a signal to a plurality of mobile recipient nodes;
   receiving interference information of each of the plurality of mobile recipient nodes from the plurality of mobile recipient nodes, the interference information contained in a slot for interference information that follows a paging slot, the paging slot for allocating a connection identifier to a link;
   determining a mobile recipient node to communicate based on the interference information; and
   transmitting data to the mobile recipient node,
   wherein the interference information is generated, by each of the plurality of mobile recipient nodes, based on a signal-to-interference ratio (SIR) which is calculated corresponding to the transmitted signal, if the signals are transmitted from each of a plurality of mobile transmission nodes to each of the plurality of mobile recipient nodes.

2. The method of claim 1, wherein the interference information is formatted as a binary bit sequence.

3. The method of claim 2,
   wherein the receiving of the interference information comprises generating an interference matrix based on the interference information, and
   wherein the determining of the mobile recipient node comprises determining based on the interference matrix.

4. The method of claim 1, further comprising:
   transmitting, when no data to be transmitted exists in a predetermined slot, a traffic-off indicator.

5. The method of claim 3, further comprising:
   receiving a traffic-off indicator transmitted by the mobile transmission node,
   reconfiguring the interference matrix so as to remove interference information associated with the mobile transmission node which has transmitted the traffic-off indicator, and
   determining the mobile recipient node according to the reconfigured interference matrix.

6. A method for reporting interference information of a mobile recipient node in a wireless communication system supporting direct communication between mobile transmission nodes and mobile recipient nodes, the method comprising:
   receiving a plurality of signals from a plurality of mobile transmission nodes;
   calculating a plurality of signal-to-interference ratios (SIRs) in association with the plurality of mobile transmission nodes based on the plurality of signals;
   generating interference information associated with each of the plurality of mobile transmission nodes of the plurality of mobile transmission nodes based on the calculated SIRs;
   broadcasting the interference information, the interference information contained in a slot for interference information that follows a paging slot, the paging slot for allocating a connection identifier to a link; and
   receiving data from the at least one mobile transmission node according to a determination based on the broadcast interference information.

7. The method of claim 6, wherein the interference information is formatted as a binary bit sequence.

8. The method of claim 6, wherein the generating of the interference information comprises:
   comparing the SIR with a predetermined threshold value.

9. The method of claim 6, wherein the determination is based on an interference matrix configured according to the interference information.

10. The method of claim 6, wherein the broadcasting of the interference information comprises:
    transmitting the interference information to a base station.

11. A mobile transmission node for communicating with a mobile recipient node in a wireless communication system supporting direct communication between mobile transmission nodes and mobile recipient nodes, the mobile transmission node comprising:
    a radio communication unit configured to transmit and receive signals to and from at least one mobile recipient node; and
    a control unit configured to:
       transmit a signal to a plurality of mobile recipient nodes,
       receive interference information of each of the plurality of mobile recipient nodes from the plurality of mobile recipient nodes, the interference information contained in a slot for interference information that follows a paging slot, the paging slot for allocating a connection identifier to a link,
       determine a mobile recipient node to communicate based on the interference information, and
       transmit data to the determined mobile recipient node,
    wherein the interference information is generated, by each of the plurality of mobile recipient nodes, based on a signal-to-interference ratio (SIR) which is calculated corresponding to the transmitted signal, if the signals are transmitted from each of a plurality of mobile transmission nodes to each of the plurality of mobile recipient nodes.

12. The mobile transmission node of claim 11, wherein the interference information is formatted as a binary bit sequence.

13. The mobile transmission node of claim 12, wherein the control unit is further configured to:
    generate an interference matrix based on the interference information, and
    determine the mobile recipient node based on the interference matrix.

14. The mobile transmission node of claim 11, wherein the control unit is further configured to transmit, when no data to be transmitted exists in a predetermined slot, a traffic-off indicator.

15. The mobile transmission node of claim 13, wherein the control unit is further configured to:
    receive a traffic-off indicator transmitted by a mobile transmission node,
    reconfigure the interference matrix so as to remove interference information associated with the mobile transmission node which has transmitted the traffic-off indicator, and
    determine the mobile recipient node according to the reconfigured interference matrix.

16. A mobile recipient node for reporting interference information in a wireless communication system supporting direct communication between mobile transmission nodes and mobile recipient nodes, the mobile recipient node comprising:
    a radio communication unit configured to transmit and receive signals to and from at least one mobile transmission node; and
    a control unit configured to:
        receive a plurality of signals from a plurality of mobile transmission nodes,
        calculate a plurality of signal-to-interference ratios (SIRs) in association with the plurality of mobile transmission nodes based on the plurality of signals,
        generate interference information associated with each of the plurality of mobile transmission nodes of the plurality of mobile transmission nodes based on the calculated SIRs,
        broadcast the interference information, the interference information contained in a slot for interference information that follows a paging slot, the paging slot for allocating a connection identifier to a link, and
        receive data from the at least one mobile transmission node according to a determination based on the broadcast interference information.

17. The mobile recipient node of claim 16, wherein the interference information is formatted as a binary bit sequence.

18. The mobile recipient node of claim 16, wherein the control unit is further configured to compare the SIR with a predetermined threshold value to generate the interference information.

19. The mobile recipient node of claim 16, wherein the determination is based on an interference matrix configured according to the interference information.

20. The mobile recipient node of claim 16, wherein the control unit is further configured to transmit the interference information to a base station.

* * * * *